United States Patent
Koinuma et al.

(10) Patent No.: US 9,519,637 B2
(45) Date of Patent: Dec. 13, 2016

(54) TEXT PROCESSING APPARATUS AND TEXT DISPLAY SYSTEM

(71) Applicants: Atsushi Koinuma, Tokyo (JP); Toshiyuki Tezuka, Tokyo (JP)

(72) Inventors: Atsushi Koinuma, Tokyo (JP); Toshiyuki Tezuka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

(21) Appl. No.: 14/456,005

(22) Filed: Aug. 11, 2014

(65) Prior Publication Data
US 2015/0057996 A1    Feb. 26, 2015

(30) Foreign Application Priority Data

Aug. 22, 2013   (JP) .................. 2013-172530

(51) Int. Cl.
*G06F 17/27* (2006.01)
*G06F 17/22* (2006.01)

(52) U.S. Cl.
CPC ....... *G06F 17/2795* (2013.01); *G06F 17/2223* (2013.01); *G06F 17/2264* (2013.01)

(58) Field of Classification Search
CPC .............. G06F 17/2795; G06F 17/2223; G06F 17/2264
USPC ................. 704/8, 203, 211, 258
See application file for complete search history.

(56) References Cited

U.S. PATENT DOCUMENTS

| | | | | |
|---|---|---|---|---|
| 5,526,259 | A * | 6/1996 | Kaji | .......... G06F 3/16 704/254 |
| 6,999,916 | B2 * | 2/2006 | Lin | ........ G06F 17/289 704/2 |
| 2002/0087302 | A1 * | 7/2002 | Tomaru | ........... G06F 17/2765 704/8 |
| 2002/0138250 | A1 * | 9/2002 | Okura | ............. G06F 17/2836 704/2 |
| 2006/0167675 | A1 * | 7/2006 | Miyahira | ............. G06F 17/273 704/2 |
| 2007/0112553 | A1 * | 5/2007 | Jacobson | ........... G06F 17/2827 704/2 |

FOREIGN PATENT DOCUMENTS

| | | |
|---|---|---|
| JP | 2009-104231 | 5/2009 |
| JP | 2011-227849 | 11/2011 |
| JP | 2011-257859 | 12/2011 |

* cited by examiner

*Primary Examiner* — Marcellus Augustin
(74) *Attorney, Agent, or Firm* — IPUSA, PLLC

(57) ABSTRACT

A text processing apparatus includes an environmental information acquisition unit configured to acquire environmental information, a text acquisition unit configured to acquire text, a word extraction unit configured to extract a word from the text, and a joint indication unit configured to convert the word extracted from the text into a converted word using a dictionary that is accessed according to the environmental information acquired by the environmental information acquisition unit and indicate the converted word along with the word extracted from the text.

9 Claims, 22 Drawing Sheets

---

FOR INFANT (EXPRESSION CONVERSION + HIRAGANA CONVERSION)
コリー社(しゃ)は、お客様(おきゃくさま)の仕事の内容・新しい技術
(しごとのないよう・あたらしいぎじゅつ)を作る(つくる)お仕事(しごと)をご提供
(ていきょう)いたします。

FIG.1 PRIOR ART

| Melos was infuriated. | ~154a |
| Melos was furious. | ~154b |
| Melos was very angry. | ~154c |

FIG.2A

1. DISPLAY DIFFICULT KANJI CHARACTERS IN HIRAGANA/KATAKANA CHARACTERS
   (E.G. KANJI) ⇒ けいえいりねん (HIRAGANA))
2. CONVERT DIFFICULT EXPRESSION INTO SIMPLER EXPRESSION
   (E.G. 経営理念 ("CORPORATE MISSION") ⇒ 会社の考え方 ("COMPANY CONCEPT"))
3. DISPLAY IMPORTANT WORD IN FOREIGN LANGUAGE
   E.G. コリーグループ [コリー公司小組 (CHINESE)]
   E.G. コリーグループ [コリーGROUP (ENGLISH)]

FIG.2B

ORIGINAL TEXT
コリー社は、お客様のワークスタイル・イノベーションを実現するITソリューションをご提供いたします。

FOR INFANT (EXPRESSION CONVERSION + HIRAGANA CONVERSION)
コリー社(しゃ)は、お客様(おきゃくさま)の仕事の内容・新しい技術(しごとのないよう・あたらしいぎじゅつ)のお客様(おきゃくさま)の仕事(しごと)をつくる(つくる)お仕事(しごと)をご提供(ていきょう)いたします。

FOR AMERICAN
コリー社(Cory)は、お客様(customer)のワークスタイル・イノベーション(work style and innovation)を実現する(realize)ITソリューション(solution)をご提供(provide)いたします。

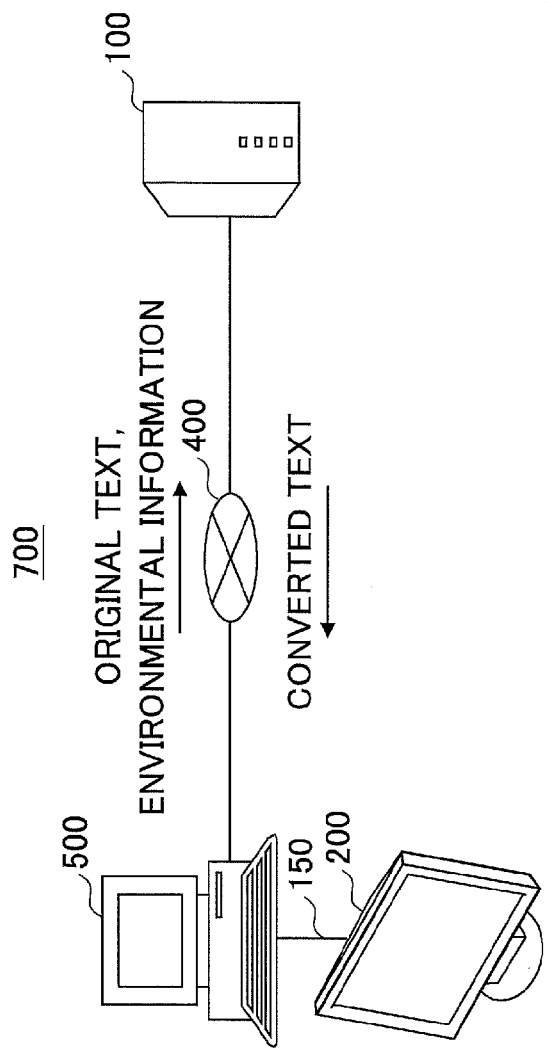
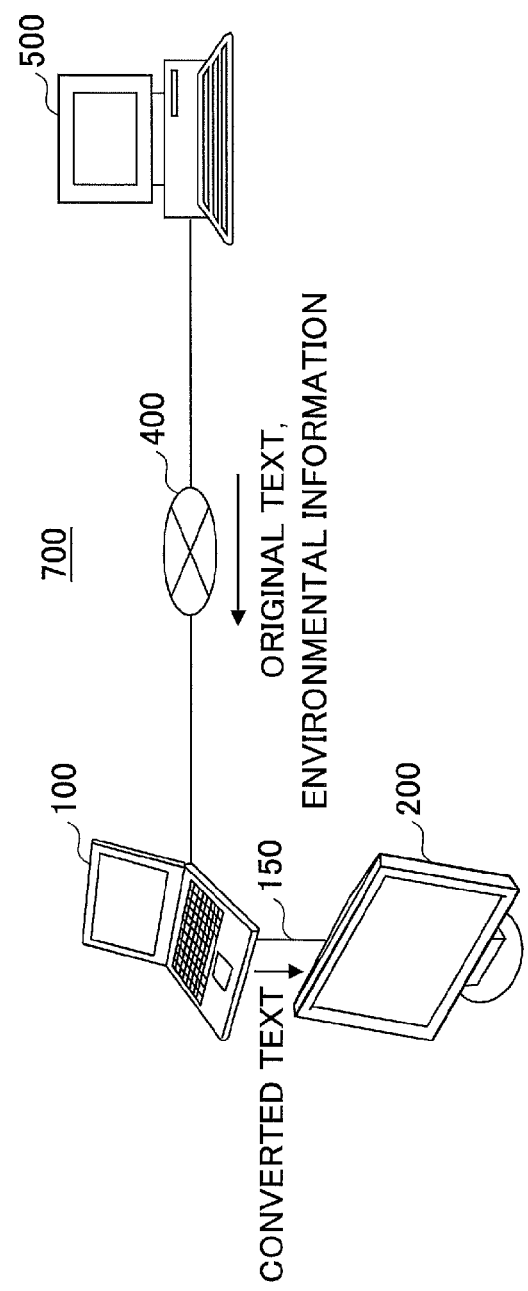
FIG.3D
FIG.3E

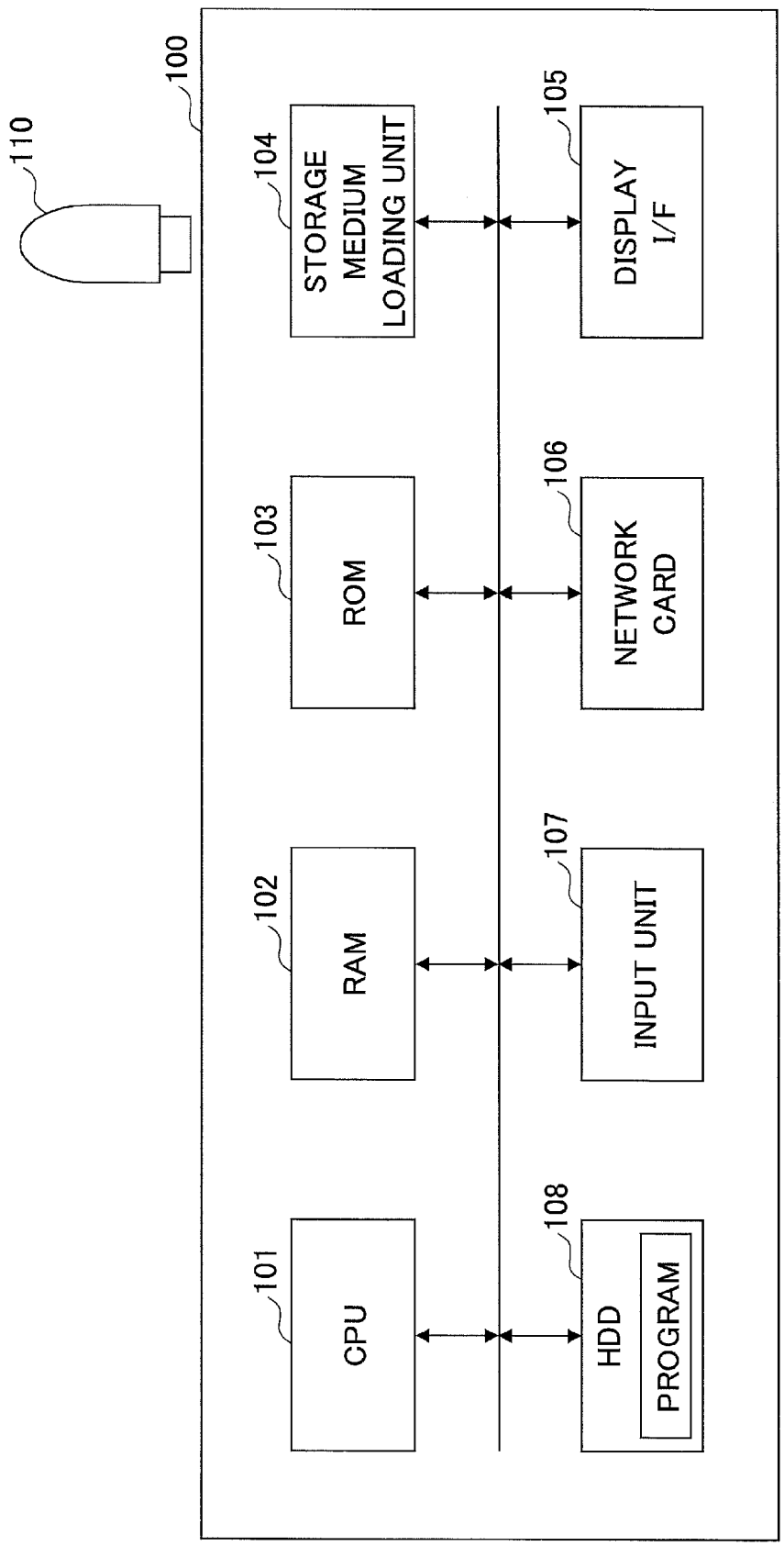

FIG.20A ORIGINAL TEXT
コリー社は、お客様のワークスタイル・イノベーションを実現するITソリューションをご提供いたします。

FIG.20B FOR INFANT (HIRAGANA CONVERSION)
コリー社(しゃ)は、お客様(おきゃくさま)のワークスタイル・イノベーションを実現(じつげん)するITソリューションをご提供(ていきょう)いたします。

FIG.20C FOR MIDDLE SCHOOLER (EXPRESSION CONVERSION)
コリー社は、お客様のワークスタイル・イノベーション(仕事の内容・新しい技術)を実現する(作る)ITソリューション(お仕事)をご提供いたします。

FIG.20D FOR INFANT (EXPRESSION CONVERSION + HIRAGANA CONVERSION)
コリー社(しゃ)は、お客様(おきゃくさま)の仕事の内容・新しい技術(しごとのないよう・あたらしいぎじゅつ)お仕事(しごと)を作る(つくる)お仕事(しごと)をご提供(ていきょう)いたします。

FIG.20E

FOR AMERICAN
コリー社(Cory)は、お客様(customer)のワークスタイル・イノベーション(work style and innovation)を実現する(realize)ITソリューション(solution)をご提供(provide)いたします。

FIG.20F

FOR CHINESE
コリー社(光理)は、お客様(顧客)のワークスタイル・イノベーションを実現する(造)ITソリューションをご提供(提供)いたします。

FIG.20G

FOR AMERICAN & CHINESE
コリー社(Cory,光理)は、お客様(customer,顧客)の仕事(work,工作)の内容・新しい技術(technology,技術)を作る(make,造)お仕事をご提供(provide,提供)いたします。

TEXT PROCESSING APPARATUS AND TEXT DISPLAY SYSTEM

BACKGROUND OF THE INVENTION

1. Field of the Invention

The disclosures herein generally relate to a text processing apparatus for processing text.

2. Description of the Related Art

Technology for providing information using display apparatuses is developing in view of the decrease in price of information processing apparatuses and display apparatuses. For example, digital signage displays are used in the city to display store information and product information. Also, at stations, LED displays and liquid crystal displays are used to display information such as operation status, departure times, and warnings. Further, it is becoming common practice to use display apparatuses to display news and advertising, for example.

However, conventional display apparatuses are not particularly adapted to be viewed by a wide range of people, and text displayed by display apparatuses may not necessarily be read/understood by every viewer. In light of such an inconvenience, a technique is disclosed that relates to improving comprehensibility/readability of text by changing certain words and expressions in the text (e.g. see Japanese Laid-Open Patent Publication No. 2011-227849). Japanese Laid-Open Patent Publication No. 2011-227849 discloses a text conversion apparatus that takes into account the reading comprehension capability of a reader and converts kanji characters (Chinese characters) into kana characters or changes the wording of a text as is necessary.

However, in the text conversion apparatus described in Japanese Laid-Open Patent Publication No. 2011-227849, while the text accommodated for a target reader is displayed, other readers may not be able to read/comprehend the text.

FIG. 1 illustrates exemplary text conversions performed by the text conversion apparatus disclosed in Japanese Laid-Open Patent Publication No. 2011-227849. In the illustrated example, two sets of different partial text data 154b and 154c incorporating different expressions for the original text "Melos was infuriated" 154a are prepared. The partial text data 154b incorporates an expression that may be read and comprehended by readers from grade 5 to grade 7, for example. The partial text data 154c incorporates an expression that may be read and understood by readers of grade 4 or lower, for example. Thus, while the partial text data 154b is displayed, readers of grade 4 or lower may not be able to read/understand the contents of the text.

In light of the above, an aspect of the present invention relates to providing a text processing apparatus that is capable of generating text that may be read/comprehended by multiple readers.

SUMMARY OF THE INVENTION

According to one embodiment of the present invention, a text processing apparatus is provided that includes an environmental information acquisition unit configured to acquire environmental information, a text acquisition unit configured to acquire text, a word extraction unit configured to extract a word from the text, and a joint indication unit configured to convert the word extracted from the text into a converted word using a dictionary that is accessed according to the environmental information acquired by the environmental information acquisition unit and indicate the converted word along with the word extracted from the text.

According to an aspect of the present invention, a text processing apparatus may be provided that is capable of generating text that may be read/comprehended by multiple readers.

BRIEF DESCRIPTION OF THE DRAWINGS

FIG. 1 illustrates exemplary text conversions according to the prior art;

FIGS. 2A-2B illustrate exemplary text conversions performed by a text processing apparatus according to an embodiment of the present invention;

FIGS. 3A-3E illustrate exemplary configurations of the text processing apparatus and text display system according to embodiments of the present invention;

FIG. 4 illustrates an exemplary hardware configuration of the text processing apparatus;

FIGS. 20A-20G illustrate display examples of an original text and converted texts.

DESCRIPTION OF THE PREFERRED EMBODIMENTS

In the following, embodiments of the present invention are described with reference to the accompanying drawings.

FIG. 2A illustrates exemplary conversion methods that may be used by a text processing apparatus according to an embodiment of the present invention. The text processing apparatus of the present embodiment converts a word primarily using the three following methods:

1. Display difficult kanji characters in hiragana/katakana characters
2. Convert difficult expression into simpler expression
3. Display important word in foreign language By using the above conversion methods 1 and 2, the meaning of each word may be comprehended by a younger age group, for example. Also, by using the above conversion method 3, a foreigner may be able to comprehend the converted word, for example.

FIG. 2B illustrates examples of text converted by the text processing apparatus of the present embodiment. In the present example, it is assumed that the original text, which is indicated below, has been prepared in contemplation of being viewed by a Japanese adult.

コリー社は、お客様のワーク スタイル・イノ ベーションを実現するＩＴソ リューションを ご提供い たします。("Cory provides IT solutions to realize the work style and innovation of customers.")

If an infant is also a potential reader of the original text to be displayed by a display apparatus, the text processing may convert the original text as follows:

コリー社（しゃ）は、お客様（おきゃ くさま）の仕事の内容・新しい技術（しごとのない いよう・あたらしいぎじゅつ）を作る（つくる）お仕事（し ごと）をご提供（ていきょう）いたします。

If an American is also a potential reader of the original text to be displayed by the display apparatus, the text processing apparatus may convert the original text as follows:

コリー社 (Cory) は、お客様 (customer) のワークスタイル・イノベ ーション (work style and innovation) を実現する (realize) IT ソリューション (solution) をご提供 (provide) いたします。

That is, the text processing apparatus of the present embodiment converts a word in an original text into another word according to the potential reader of the text and displays the converted word along with the original word. By displaying the converted word along with the original word, not only Japanese adults but other potential target readers that may read the text (e.g. foreigners, children) may be able to read/comprehend the text at the same time.

In the following descriptions, a target reader that is expected to read the original text is referred to as "main target", and a reader other than the main target is referred to as "potential target". Also, information used by a user of the text processing apparatus for specifying the potential target is referred to as "environmental information". The main target is assumed to be a Japanese adult in the present example, but the main target may change depending on various environmental factors such as the location at which the text is to be displayed, for example. The potential target may be an infant, an elementary schooler, a middle schooler, and/or a foreigner, for example.

[Configuration]

Figures 3A, 3B, 3C:
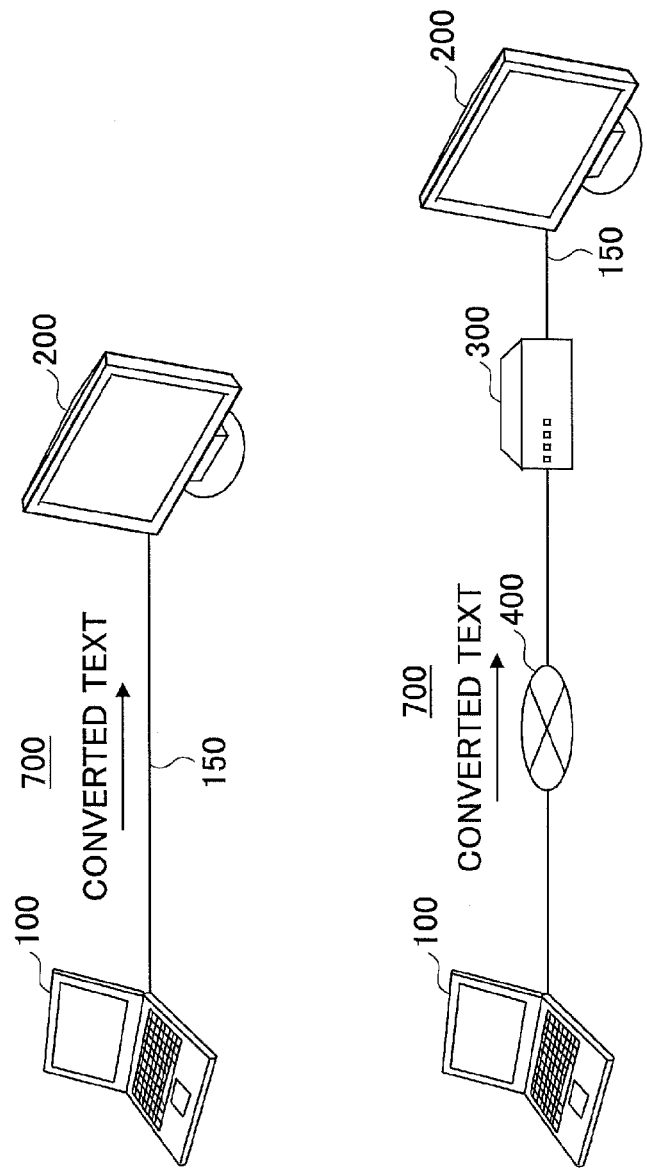

FIGS. 3A-3E illustrate exemplary configurations of a text processing apparatus and a text display system according to embodiments of the present invention. FIG. 3A illustrates a standalone PC (Personal Computer) as a main component of a text processing apparatus 100 according to an embodiment of the present invention. The text processing apparatus 100 converts a word into another word according to environmental information input by a user or acquired from the outside and generates a converted text including the converted word along with the original word of the text. The text processing apparatus 100 displays the converted text on a built-in display apparatus incorporated in the text processing apparatus 100.

Note that the text processing apparatus 100 may be any information processing apparatus including a PC, a smartphone, a tablet PC, a PDA (Personal Digital Assistant), and an image forming apparatus such as a printer or a multi-function peripheral, for example.

FIG. 3B illustrates an exemplary configuration of a text display system 700 including the text processing apparatus 100 and a display 200 that are connected to each other. The text processing apparatus 100 and the display 200 may be interconnected, for example, via a video cable 150 such as HDMI (High-Definition Multimedia Interface; registered trademark). As in FIG. 3A, the text processing apparatus 100 generates a converted text and displays the converted text on the display 200.

FIG. 3C illustrates another exemplary configuration of the text display system 700. In the text display system 700 illustrated in FIG. 3C, the text processing apparatus 100 and a terminal 300 are interconnected via a network 400, and the display 200 is connected to the terminal 300. The terminal 300 may be an information processing apparatus such as a PC, for example. As in FIG. 3A, the text processing apparatus 100 generates a converted text and transmits the converted text to the terminal 300. The terminal 300 receives the converted text and displays the converted text on the display 200. Note that the network 400 may be a local area network (LAN), a wide area network (WAN), a public telephone line such as a mobile phone network, or a combination thereof, for example.

FIG. 3D illustrates another exemplary configuration of the text display system 700. In the text display system 700 illustrated in FIG. 3D, a PC 500 and the text processing apparatus 100 are interconnected via the network 400. Also, the display 200 is connected to the PC 500. In this embodiment, the PC 500 acts as a server that transmits an original text and environmental information to the text processing apparatus 100, and the text processing apparatus 100 generates and transmits a converted text to the PC 500. In turn, the PC 500 displays the received converted text on the display 200. Note that the text display system 700 according to the present embodiment may be a cloud-based system or a client-server system, for example.

FIG. 3E illustrates another exemplary configuration of the text display system 700. In FIG. 3E, the PC 500 and the text processing apparatus 100 are interconnected via the network 400. The display 200 is connected to the text processing apparatus 100. In this embodiment, the PC 500 transmits the original text and environmental information to the text processing apparatus 100, and the text processing apparatus 100 generates a converted text. The text processing apparatus 100 then displays the converted text on the display 200. Note that the text display system 700 of the present embodiment may be a remote operation type text display system.

As can be appreciated, the text processing apparatus 100 and the text display system 700 may be arranged into various forms and configurations. Note that the text processing apparatus 100 according to embodiments of the present invention may be improved and modified in various ways within the scope of the present invention. In the following, the text processing apparatus 100 according to the embodiment illustrated in FIG. 3B is primarily described as a representative example.

FIG. 4 is a block diagram illustrating an exemplary hardware configuration of the text processing apparatus 100. The text processing apparatus 100 illustrated in FIG. 4 includes a CPU 101, a RAM 102, a ROM 103, a storage medium loading unit 104, a display I/F 105, a network card 106, an input unit 107, and a HDD 108 that are interconnected by a bus. The CPU 101 implements various functions by reading and executing an OS (operating system) and various programs stored in the HDD 108, and controls overall process operations of the text processing apparatus 100, for example.

The RAM 102 acts as a working memory (main memory) that temporarily stores data necessary for the CPU 101 to execute a program. The ROM 103 stores programs and setting files for starting an OS or a BIOS (Basic Input Output System), for example.

The storage medium 110 may be loaded/unloaded in/out of the storage medium loading unit 104. The storage medium loading unit 104 reads a program stored in the storage medium 110, and stores the read program in the HDD 108. The storage medium loading unit 104 may also write data stored in the HDD 108 on the storage medium 110, for example. The storage medium 110 may be a USB memory, a SD memory card, a DVD-ROM, or a CD-ROM for example.

The input unit 107 may include at least one of a keyboard, a mouse, a touch screen, a touch pad, and an audio input device, for example. The input unit 107 receives various operation commands from a user using the text processing apparatus 100.

The HDD 108 may be a non-volatile memory such as a SSD (solid-state drive), for example, and stores the OS, various programs and files, and various dictionaries, which are described below, for example. Note that the HDD 108 may be embedded in the text processing apparatus 100, or the HDD 108 may be arranged on a network that can be accessed by the text processing apparatus 100, for example.

The display I/F 105 is connected to a built-in display apparatus as well as the display 200 and is configured to display a converted text on the built-in display apparatus and the display 200. The display 200 may be a generic display device such as a liquid crystal display, a plasma display, or an organic EL display, for example.

The network card 106 is a communication device for establishing connection with the network 400. For example, the network card 106 may be an Ethernet (registered trademark) card.

Note that a relevant program may be distributed by storing the program in the storage medium 110 and loading the program to the text processing apparatus 100, or downloading the program to the text processing apparatus 100 from a server (not shown), for example. Further, the program may be compressed for installation or distributed in executable form, for example.

Note, also, that the text processing apparatus 100, the terminal 300, and the PC 500 may have the same hardware configuration as illustrated in FIG. 4. Accordingly, detailed descriptions of the hardware configurations of the terminal 300 and the PC 500 are omitted.

[Text Conversion Overview]

Figure 5:
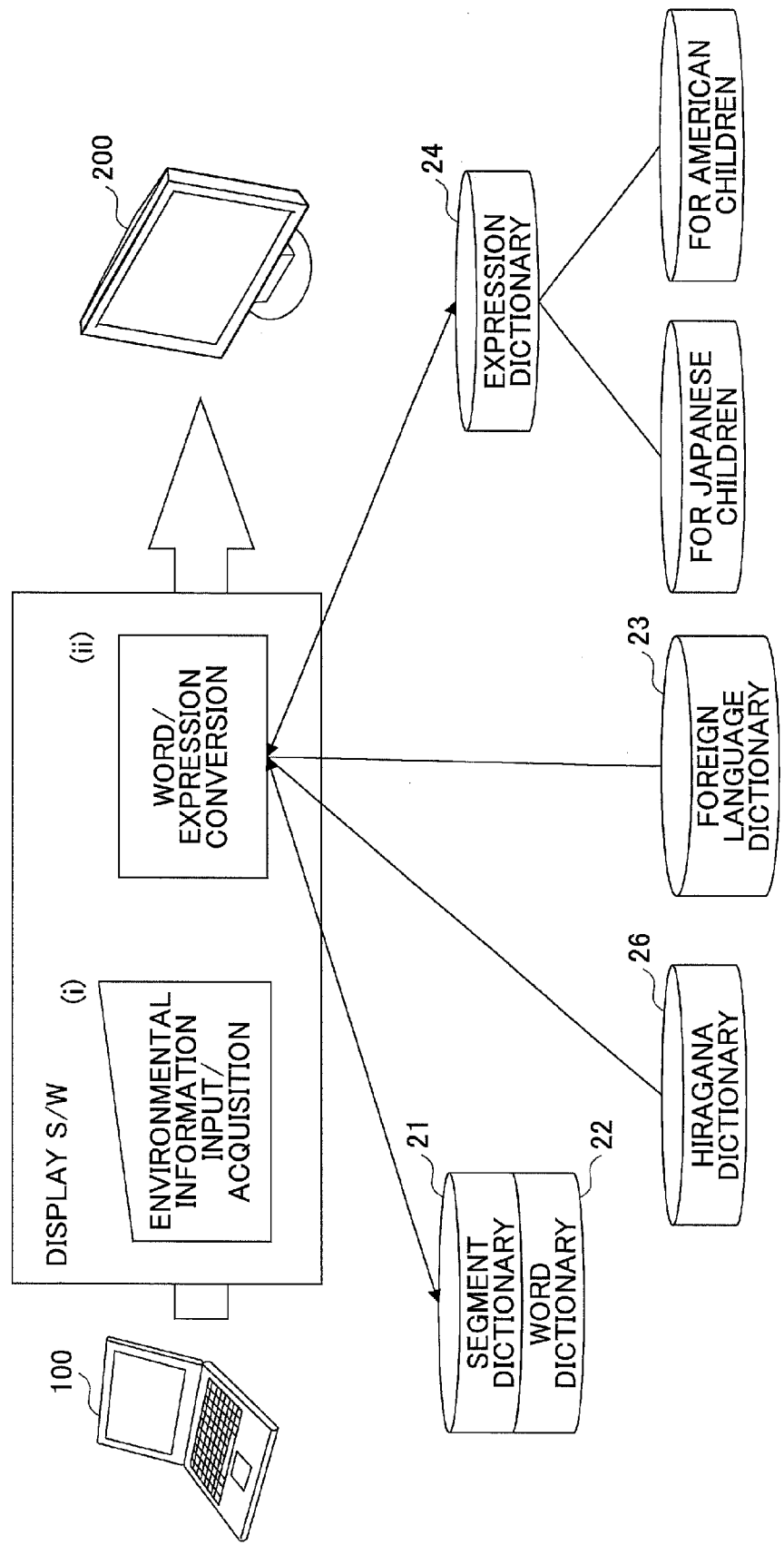
FIG. 5 illustrates a general overview of text conversion performed by the text processing apparatus.

FIG. 5 illustrates a general overview of text conversion performed by the text processing device 100 of the present embodiment. The text processing apparatus 100 mainly performs the following two processes in response to the pressing of a display S/W (switch).

(i) Environmental Information Input/Acquisition
(ii) Word/Expression Conversion

In the environmental information input/acquisition process, environmental information is entered or transmitted from the outside. Note that an original text may be input/acquired along with or before/after the environmental information.

In the word/expression conversion process, word/expression conversion may be performed using a segment dictionary 21, a word dictionary 22, a hiragana dictionary 26, a foreign language dictionary 23, and an expression dictionary 24 (e.g. for Japanese children, for American children, etc.), which are described below. Note, however, that the dictionaries used in the word/expression conversion process are not limited to these dictionaries.

Segment Dictionary: dictionary used for performing morphological analysis on the original text Word Dictionary: dictionary containing common words similarly used for morphological analysis of the original text Hiragana Dictionary: dictionary for converting hiragana into kanji Foreign Language Dictionary: dictionary for converting Japanese into a foreign language Expression Dictionary: dictionary for converting a difficult word or kanji into a simpler expression; a Japanese expression dictionary includes simpler expressions in Japanese, whereas an English expression dictionary (e.g. for Americans) include simpler expressions in English The dictionary to be used in the word/expression conversion process may be specified by the environmental information. The text processing apparatus 100 performs morphological analysis on the original text by breaking down the original text into words (individual parts of speech), and converts a word in the original text into another word using a dictionary (e.g. at least one of the hiragana dictionary, the foreign language dictionary, and the expression dictionary) associated with the environmental information. Then, the text processing apparatus 100 generates a converted text by indicating the converted word along with the original word in the text. In this way, a converted text may be created that can be comprehended not only by the main target reader of the original text but also a potential target reader specified by the environmental information, for example.

[Function and Database]

Figure 6:
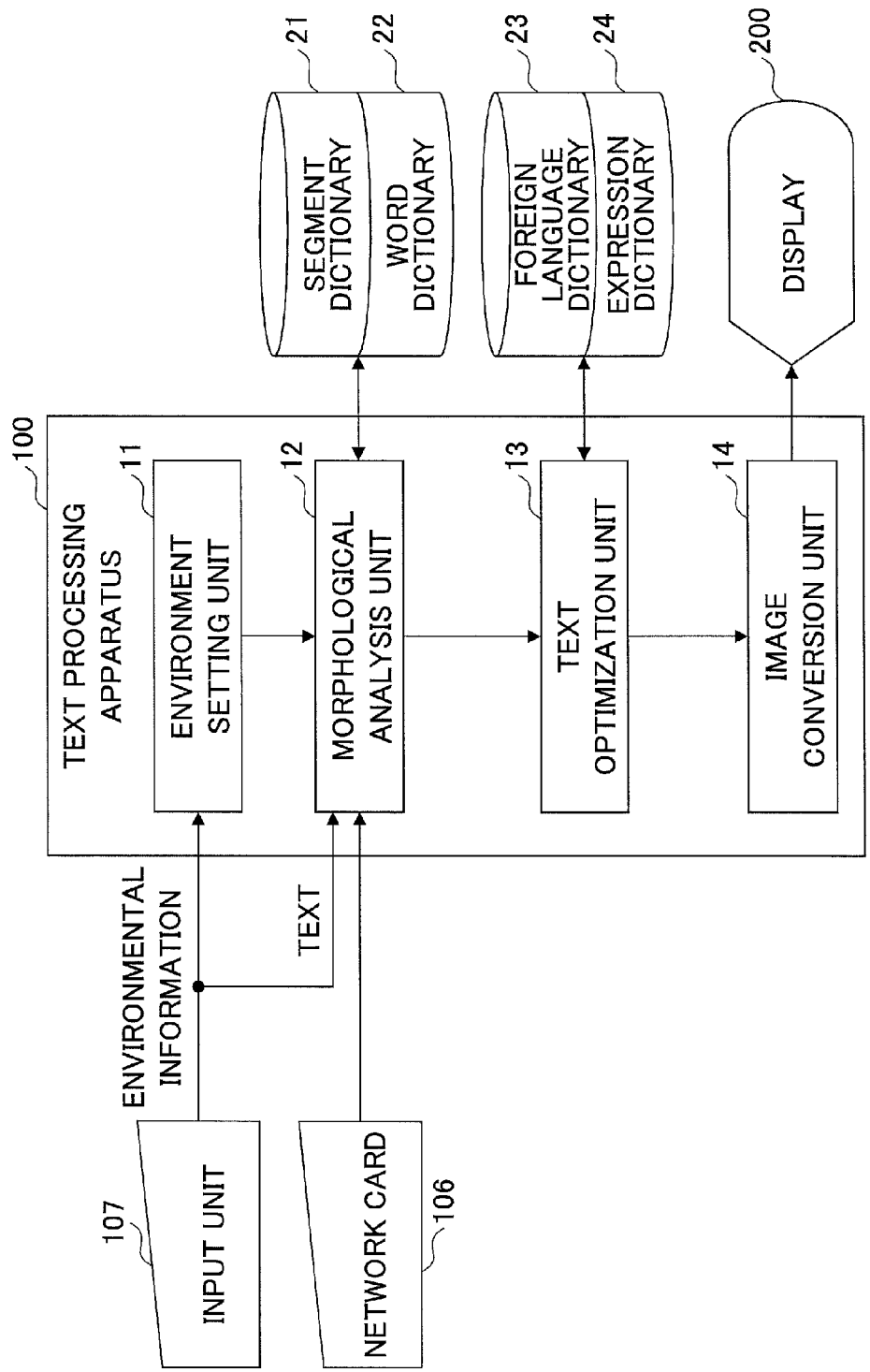
FIG. 6 is a block diagram illustrating an exemplary functional configuration of the text processing apparatus.

FIG. 6 is a block diagram illustrating an exemplary functional configuration of the text processing apparatus 100. In FIG. 6, the text processing apparatus 100 includes an environment setting unit 11, a morphological analysis unit 12, a text optimization unit 13, and an image conversion unit 14. These functional elements may be implemented by the CPU 101 executing a relevant program stored in the HDD 108 and cooperating with various hardware components, for example.

The environment setting unit 11 is an exemplary embodiment of an environmental information acquisition unit. The environment setting unit 11 receives environmental information from the input unit 107. As described below, the environmental information may specify a potential target itself, or indirectly specify the potential target by specifying the location of the display 200, for example.

Environmental information specifying potential target itself: elementary schooler, middle schooler, Chinese, American, etc.

Environmental information indirectly specifying potential target by location: elementary school, hospital, etc.

The environment setting unit 11 may display one or more preregistered potential targets or locations and accept a selection of a potential target or location from the user operating the input unit 107, for example. Alternatively, instead of accepting a user selection, the environment setting unit 11 may directly receive an input of the potential target or location, for example. In either case, the environment setting unit 11 may accept the environmental information as a file, for example.

Note that instead of receiving the environmental information setting independently, the environment setting unit 11 may receive the environmental information along with the original text, for example. In this case, the user may attach the environmental information or identification information of the environmental information at the beginning of the original text in a pre-designated format, for example.

The morphological analysis unit 12 is an exemplary embodiment of a text acquisition unit and a word extraction unit. The morphological analysis unit 12 performs morphological analysis on the original text using the segment dictionary 21 and the word dictionary 22, and divides the original text into segments. The segments of the original text may be separated by a comma (","), a space (" "), or a colon (":"), for example. The original text may be input via the input unit 107, for example. That is, the user may input the original text using a keyboard, a mouse, or a microphone, for example. The original text may also be transmitted from the outside as a file, for example. That is, the text processing apparatus 100 may receive the original text (e.g. stored as a text file) from an external PC via the network card 106, for example. Further, the original text may be stored in the HDD 108 or the storage medium 110 beforehand, and the text processing apparatus 100 may read the original text from the HDD 108 or the storage medium 110, for example.

The text optimization unit 13 is an exemplary embodiment of a joint indication unit. The text optimization unit 13 generates a converted text using a relevant dictionary such as the foreign language dictionary 23 and/or the expression dictionary 24 according to the environmental information. For example, if the environmental information is "Chinese", the text optimization unit 13 may use the foreign language dictionary 23 to find a corresponding Chinese word for a word in the original text and display the corresponding Chinese word along with the original word of the text. Also, if the environmental information is "infant", the text optimization unit 13 may use the expression dictionary 14 to display a simpler expression along with a word of the original text, for example. Further, if the environmental information is "elementary schooler", the text optimization unit 13 may display hiragana along with kanji included in the original text, for example.

The image conversion unit 14 rasterizes the converted text data to generate bitmap data and displays the bitmap data on the display 200.

[Morphological Analysis]

Figure 7:
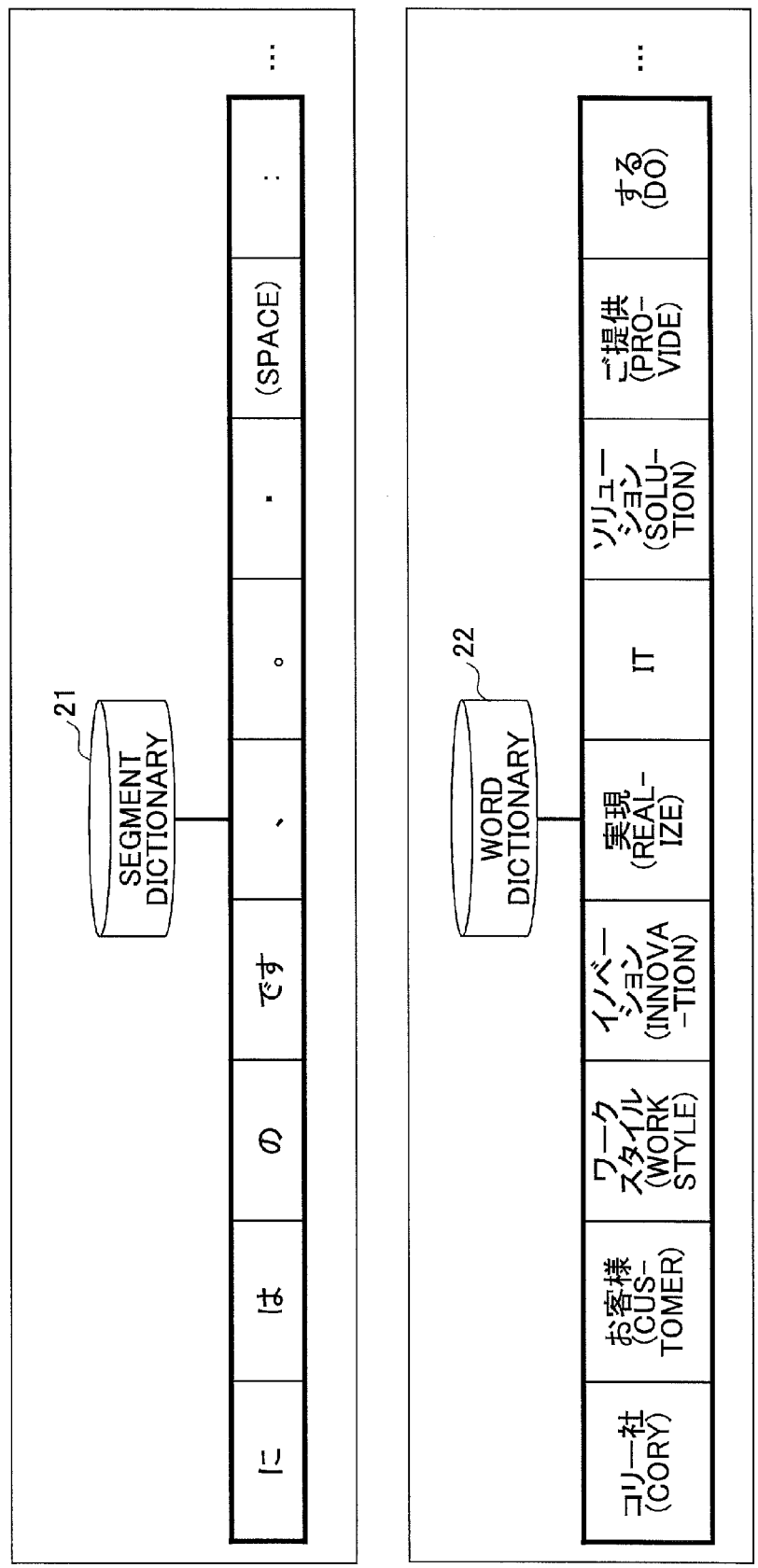
FIG. 7 illustrates an example of morphological analysis performed by a morphological analysis unit.

FIG. 7 illustrates an exemplary morphological analysis performed by the morphological analysis unit 12. Morphological analysis involves separating a text into meaningful words and determining the part of speech of each word using a dictionary. Note, however, that the morphological analysis in the present embodiment does not necessarily require the determination of the part of speech of each word as long as the morphological analysis unit 12 can extract each word and break down the original text into individual words.

The segment dictionary 21 has particles and punctuation marks registered therein. For example, particles such as "に", "は", "の", "です", and punctuation marks such as "、", "。", ".", and " " (space) may be registered in the segment dictionary 21. Because particles often appear at the end of a segment, a text may be divided into segments based on particles included therein, and a determination may be made as to whether a word or an expression is included in each segment, for example.

Also, words are registered in the word dictionary 22. The word dictionary 22 may have common words in the Japanese language registered therein. For example, words extracted from a typical Japanese dictionary may be included in the word dictionary 22. The word dictionary 22 may include words such as nouns, proper nouns, verbs, katakana words, and simple English words, for example.

The morphological analysis unit 12 searches the original text that has been divided into segments to detect words that are registered in the word dictionary 22, and breaks down the original text into individual words. That is, the original text may be divided into morphemes by using the segment dictionary 21 to divide the original text into segments and using the word dictionary 22 to further divide the segments into individual words.

For example, the following morphological analysis may be performed on an original text that reads as follows: "コリー社は、お客様のワーク スタイル・イノベーションを実現する I T ソリューションをご提供いたします。". Note that in the first morphological analysis result indicated below, morphemes are separated by commas (","), and in the second morphological analysis result indicated below, the morphemes are separated by triangles ("△").

1. コリー社, は, お客様, の, ワークスタイル, •, イノベーション, を, 実現, する, IT, ソリューション, を, ご提供, いたします。

2. コリー社△は, △お客様△の △ワークスタ イル△・△イノベーション △を△実現△す る△ IT   △ソリューショ ン△を△ご提 供△いたします。

Note that the morphological analysis that may be performed is not limited to the above. In other examples, a versatile morphological analysis engine may be used to perform the morphological analysis. Also, instead of having the text processing apparatus 100 perform the morphological analysis, an external service may be used to perform the morphological analysis, for example. In this case, the text processing apparatus 100 may transmit the original text to a server connected to a network and acquire the morphological analysis result from the server, for example.

[Generation of Converted Text]

Figure 8:
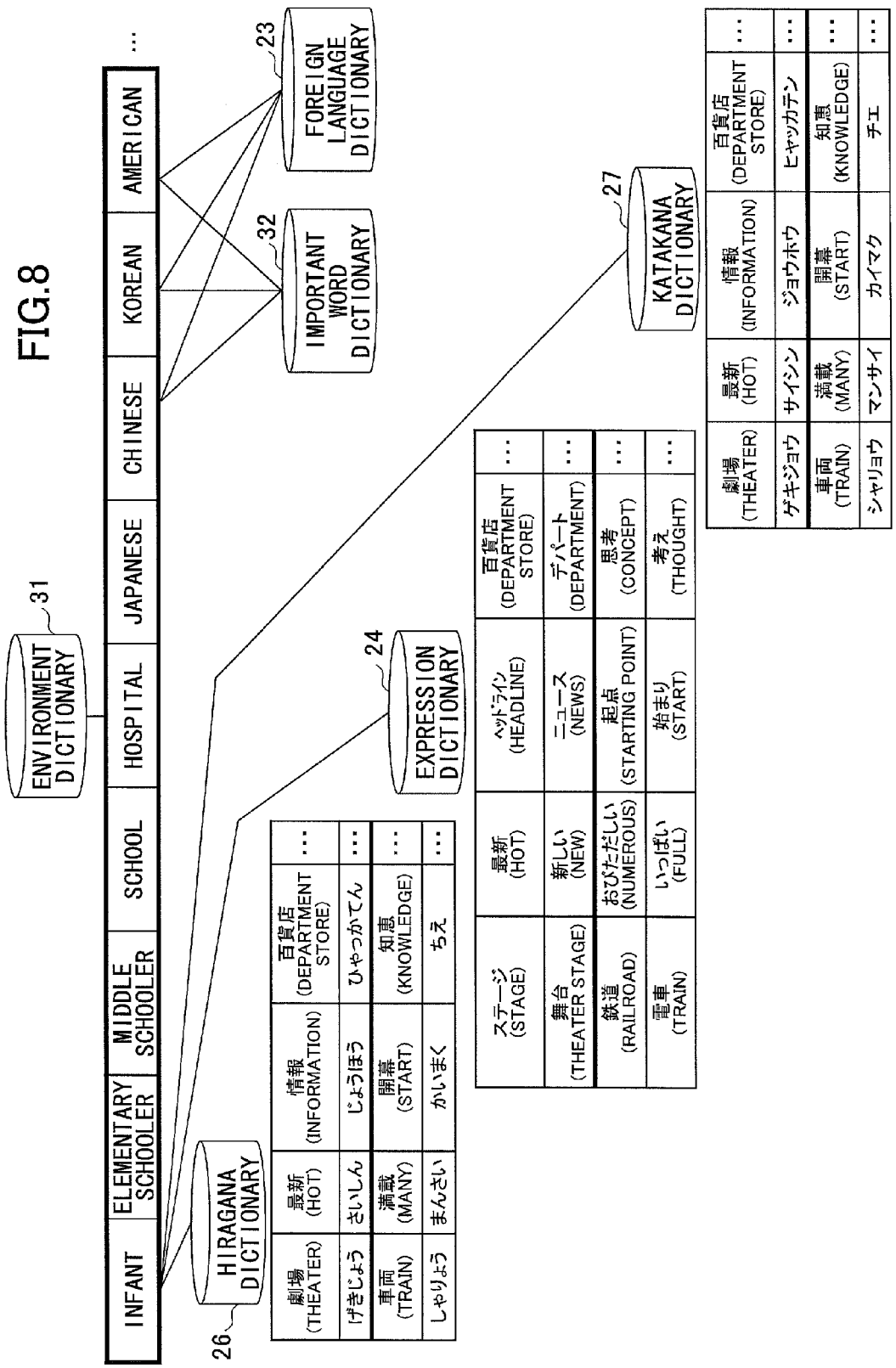
FIG. 8 illustrates examples of an environment dictionary, a hiragana dictionary, an expression dictionary, and a katakana dictionary.

FIG. 8 schematically illustrates exemplary data structures of the environment dictionary 31, the hiragana dictionary 26, the expression dictionary 24, and the katakana dictionary 27. The environment dictionary 31 stores various forms of environmental information. As described above, the environmental information may specify a potential target or the location of the display 200 corresponding to a display apparatus, for example. Various words are registered in the hiragana dictionary 26, the expression dictionary 24, and the katakana dictionary 27. Note that the words registered in these dictionaries are examples of dictionary-registered words of the present invention.

The environmental information registered in the environment dictionary 31 is associated with one or more dictionaries. The text optimization unit 13 selects a relevant dictionary based on the association, and converts a word included in the original text into another word using the selected dictionary.

For example, in FIG. 8, the environmental information "infant" is associated with the hiragana dictionary 26, the expression dictionary 24, and the katakana dictionary 27. In the case where the environmental information of the environment dictionary 31 is associated with a number n (n≥2) of dictionaries, the text optimization unit 13 may perform multiple conversions with respect to a word included in the original text. Note, however, that not every word of the original text has to be converted into another word using the dictionaries, and the user may be able to specify option settings upon inputting environmental information. For example, the user may designate a desired conversion (e.g. select the hiragana dictionary 26, the expression dictionary 24, or the katakana dictionary 27), or designate a combination of two or more conversions.

The hiragana dictionary 26 has phonetic transcriptions (yomigana) of common kanji words (e.g. words registered in the word dictionary 22) registered therein. Note that although not illustrated, there may be a hiragana dictionary 26 for elementary school children and a separate hiragana dictionary 26 for middle school children, for example.

Similarly, the katakana dictionary 27 has phonetic transcriptions of common kanji words registered therein. Although not illustrated, there may be a katakana dictionary 27 for elementary school children and a separate katakana dictionary 27 for middle school children, for example.

The expression dictionary 24 has simple easy-to-understand expressions of common words registered therein. Although not illustrated, there may be an expression dictionary 24 for elementary school children and a separate expression dictionary 24 for middle school children, for example. Further, there may be an expression dictionary 24 for a foreign language, for example.

Also, some of the environmental information may be associated with an important word dictionary 32 and a foreign language dictionary 23. That is, in FIG. 8, the environmental information "Chinese", "Korean", and "American" are associated with the important word dictionary 32 and the foreign language dictionary 23. A word registered in the important word dictionary 32 is converted (translated) into a corresponding foreign word based on the foreign language dictionary 23. For example, when the environmental information is "Chinese", words in the original text that correspond to important words registered in the important word dictionary 32 are converted into Chinese words using a Chinese dictionary 322 (described below). Note that the important words are similarly converted into corresponding foreign words when the environmental information is "Korean" or "American".

Figure 9:
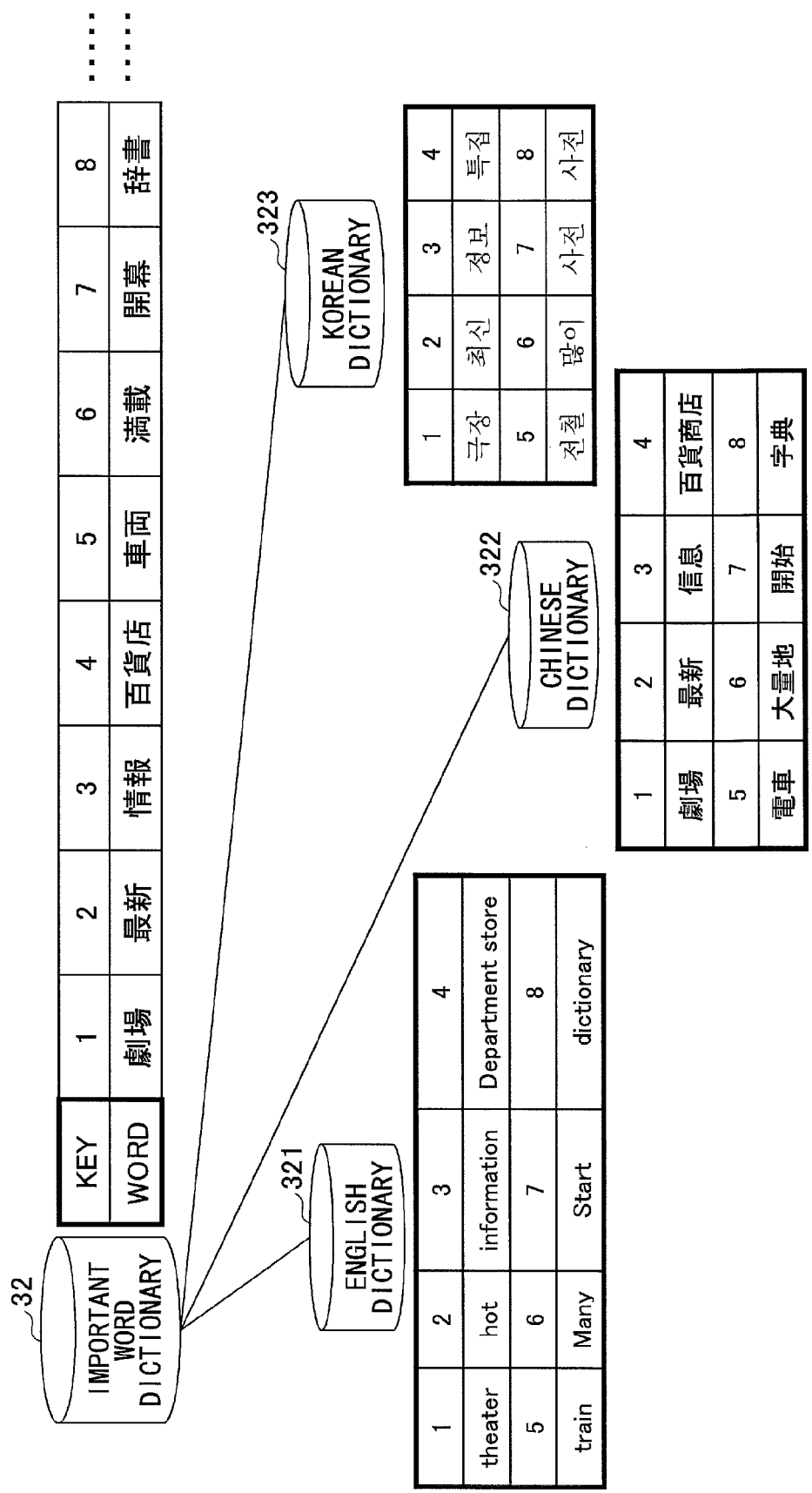
FIG. 9 illustrates an example of an important word dictionary and examples of foreign language dictionaries.

FIG. 9 illustrates an example of the important word dictionary 32, and examples of the foreign language dictionary 23. The important word dictionary 32 includes words that may be important in enabling a foreigner to comprehend the meaning of a text. That is, key words for enabling a foreigner to understand the content of the text are registered in the important word dictionary 32. By maintaining a list of important words, an easy-to-understand converted text may be generated without requiring the conversion of each word in the original text into a corresponding foreign word, for example.

If the original text includes a word registered in the important word dictionary 32, the text optimization unit 13 converts this word into a corresponding foreign word using the foreign language dictionary 23 associated with the environmental information. Examples of the foreign language dictionary 23 include an English dictionary 321, a Chinese dictionary 322, and a Korean dictionary 323. Note, however, that the foreign language dictionary 23 is not limited to the above, but may also include other foreign language dictionaries such as a French dictionary, and a Russian dictionary, for example.

Note that in some cases, one original text may be converted using multiple foreign language dictionaries 23. For example, in a case where the potential target includes Americans and Chinese, a word may be converted into English using the English dictionary 321, and the English word may be displayed along with the word of the original text. Further, the word may be converted into Chinese using the Chinese dictionary 322, and the Chinese word may be displayed along with the word of the original text and the corresponding English word, for example.

Note that a unique (non-overlapping) key (number) is assigned to each word that is registered in the important word dictionary 32. Similarly, the key is assigned to each word registered in the foreign language dictionary 23. Words registered in the important word dictionary 32 and the foreign language dictionary 23 are associated with each other by such key. Thus, the text optimization unit 13 may rely on the key assigned to a word in the important word dictionary 32 and read a corresponding foreign word from the foreign language dictionary 23 for a word with the same key, for example.

Note that the key is not limited to being a number, but may be any identification information such as an alphabet, a symbol, or a character for unambiguously identifying each word registered in the important word dictionary 32 and the foreign language dictionary 23, for example.

Figure 10:
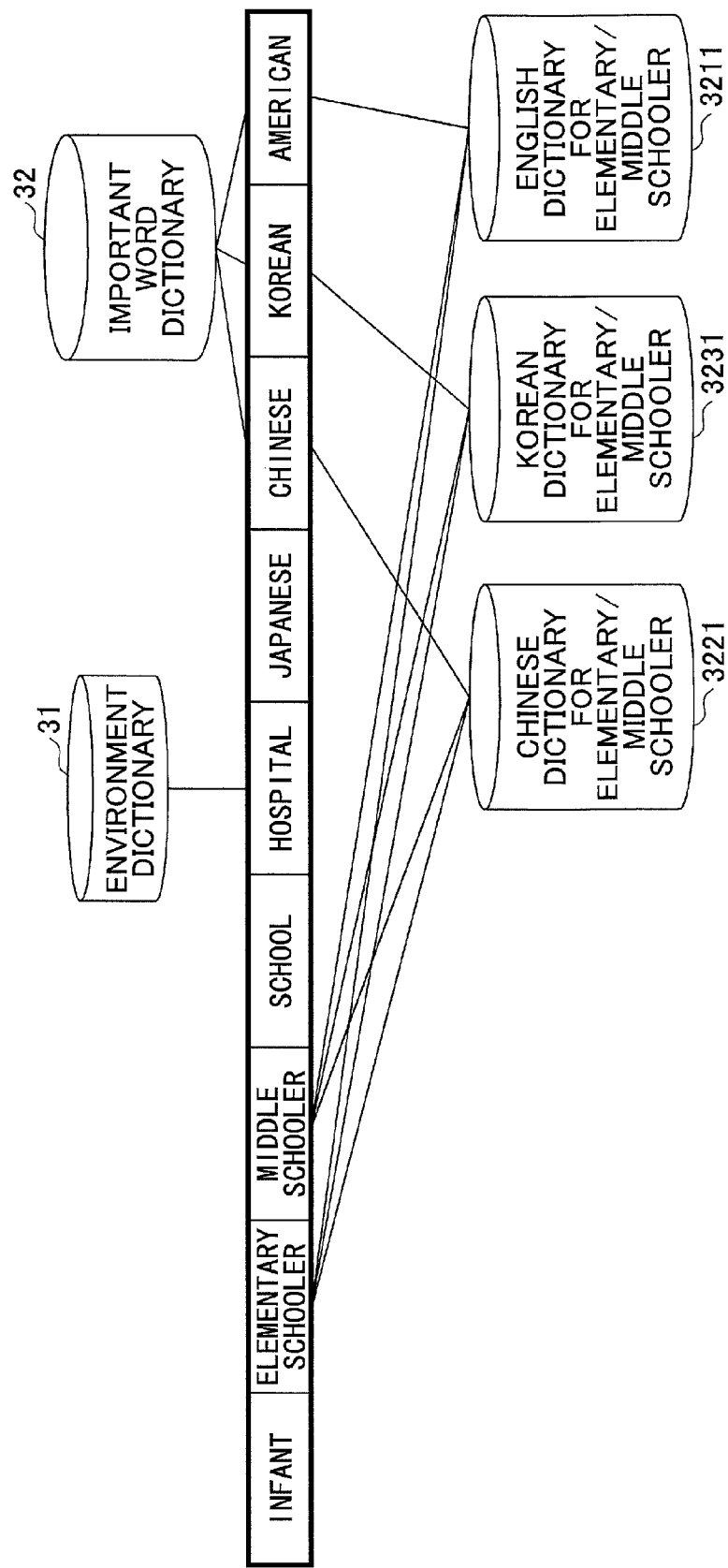
FIG. 10 an exemplary association between the environment dictionary and foreign language dictionaries.

FIG. 10 illustrates another exemplary association between the environment dictionary 31 and the foreign language dictionary 23. Note that a word that is registered in the important word dictionary 32 may be translated into a foreign language using the foreign language dictionary 23 to enable a foreigner to understand a text. However, the reading capability of a foreigner may vary depending on the age of the foreigner, for example. That is, the foreigner may be in any of various age groups ranging from infants, adolescents, to adults, for example. Accordingly, in the present example, in order to enable optimal translation based on the environmental information associated with the important word dictionary 32, foreign language dictionaries 23 are provided that are associated with multiple items of environmental information. For example, the multiple items of environmental information may be a combination of environmental information associated with the important word dictionary 32 and environmental information specifying a potential target such as "Chinese" and "elementary schooler" or "Chinese" and "middle schooler".

In the example illustrated in FIG. 10, a Chinese dictionary for elementary/middle schooler 3221, a Korean dictionary for elementary/middle schooler 3231, and an English dictionary for elementary/middle schooler 3211 are associated with different combinations of environmental information. In this way, optimal translation may be enabled according to the potential target, for example.

In this case, the user may input multiple items of environmental information (e.g. "Chinese" and "elementary schooler") according to the types of foreign language dictionaries 23 that are provided, for example.

Note that the combination of the environmental information is not limited to a combination of environmental information specifying a potential target, but may also be a combination of environmental information specifying a potential target and environmental information specifying a location. For example, the Chinese dictionary for elementary/middle schooler 3221 may be associated with a combination of the environmental information "Chinese" and "school". In this way, optimal translation may be enabled for Chinese elementary/middle school children as the potential target.

Also, although not illustrated, the environmental information "Japanese" may be associated with the important word dictionary 32, and a hospital dictionary (not shown) may be associated with a combination of the environmental information "Japanese" and "hospital", for example. In this case, a word in the original text that corresponds to a specific word used at a hospital may be converted according to the hospital dictionary such that a converted text displayed on the display 200 may be easily understood by a Japanese reader.

Also, in some cases, three or more items of environmental information such as "Chinese", "elementary schooler", and "hospital" may be associated with a specific foreign language dictionary 23, for example. That is, by increasing the types of dictionaries, the potential target may be further specified, and suitable conversion of a relevant word may be enabled. On the other hand, when the user believes that it is rather difficult to narrow down a potential target, the user may limit the number of environmental information inputs (e.g. only entering "Chinese" even though "Chinese" and "elementary schooler" may be input) such that conversion adapted for a broader potential target may be enabled, for example.

[Operations]

Figure 11:
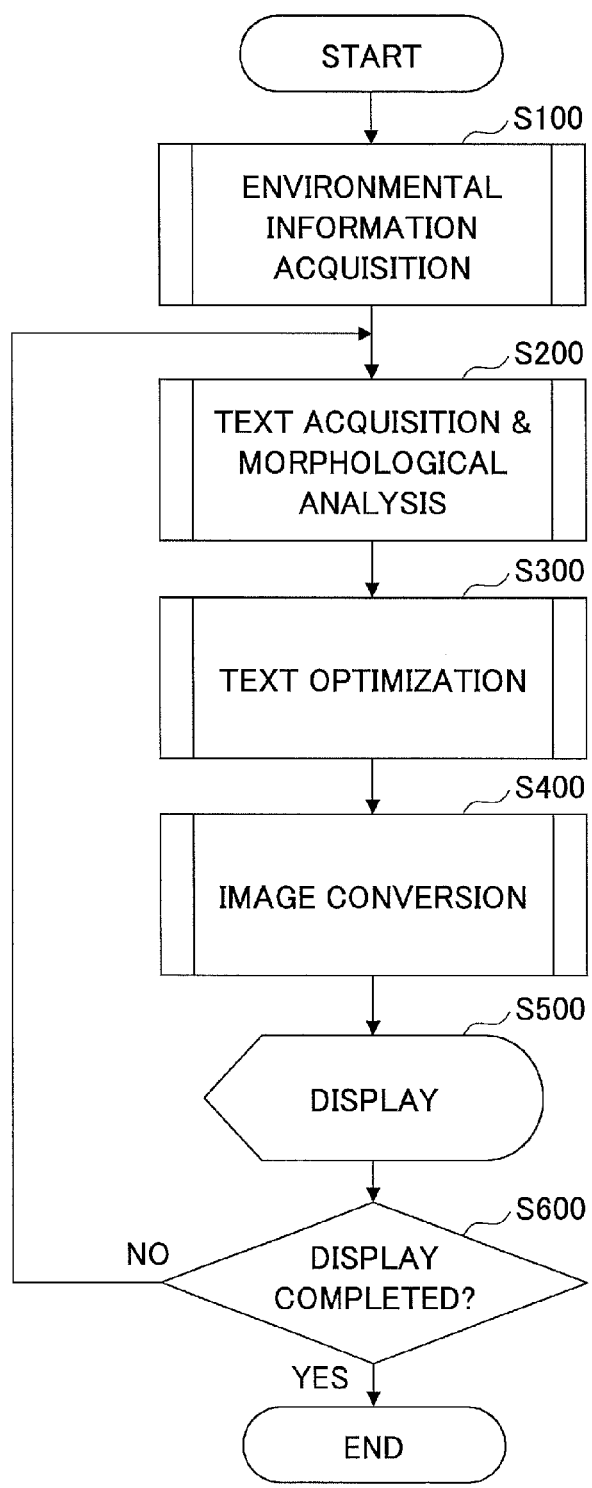
FIG. 11 is a flowchart illustrating exemplary process operations of the text processing apparatus.

FIG. 11 is a flowchart illustrating exemplary process operations of the text processing apparatus 100.

In step S100, the environment setting unit 11 receives an input of environmental information. Note that when the potential target is fixed, the environmental information may be set up beforehand.

Note that in some embodiments, the user may set up the environmental information along with the original text. For example, the user may set up the environmental information and the original text as follows:

Infant: コリー社は、お客様のワークスタイル・イノベーションを実現するITソリューションをご提供いたします。

In another example, the user may set up identification information of the environmental information as follows:

02: コリー社は、お客様のワークスタイル・イノベーションを実現するITソリューションをご提供いたします。

Note that in the above example, "02" corresponds to identification information of the environmental information.

Setting up the environmental information in the above manner may be advantageous in a case where the potential target frequently changes in real time. For example, in the embodiment illustrated in FIG. 3E, the PC 500 may repeatedly transmit the original text to the text processing apparatus 100, and the text processing apparatus 100 may display the received original text in real time. By attaching the environmental information at the beginning of the original text, the text processing apparatus 100 may always acquire the environmental information at the outset, and convert the original text following the environmental information according to the acquired environmental information. In this way, the text processing apparatus 100 may be able to display in real time a converted text that is optimized according to the potential target, for example.

In step S200, the morphological analysis unit 12 receives an input of the original text, and the morphological analysis unit 12 performs morphological analysis on the received original text.

In step S300, the text optimization unit 13 generates a converted text from the original text that is divided into individual words. Note that this process is described in detail below.

In step S400, the image conversion unit 14 turns the converted text into an image. That is, the image conversion unit 14 rasterizes the converted text and converts it into visual data such as bitmap data, for example.

In step S500, the text processing apparatus 100 displays the converted text on the display 200.

In step S600, the text processing apparatus 100 determines whether there is still text to be processed and displayed. Note that a predetermined special code such as "￥￥" or "Eof" is attached to the end of the original text as illustrated in the following example.

コリー社は、お客様のワークスタイル・イノベーションを実現するITソリューションをご提供いたします。￥￥

In the above example, the text processing apparatus 100 ends the process upon detecting the special code "￥￥" attached at the end of the original text.

Figure 12:
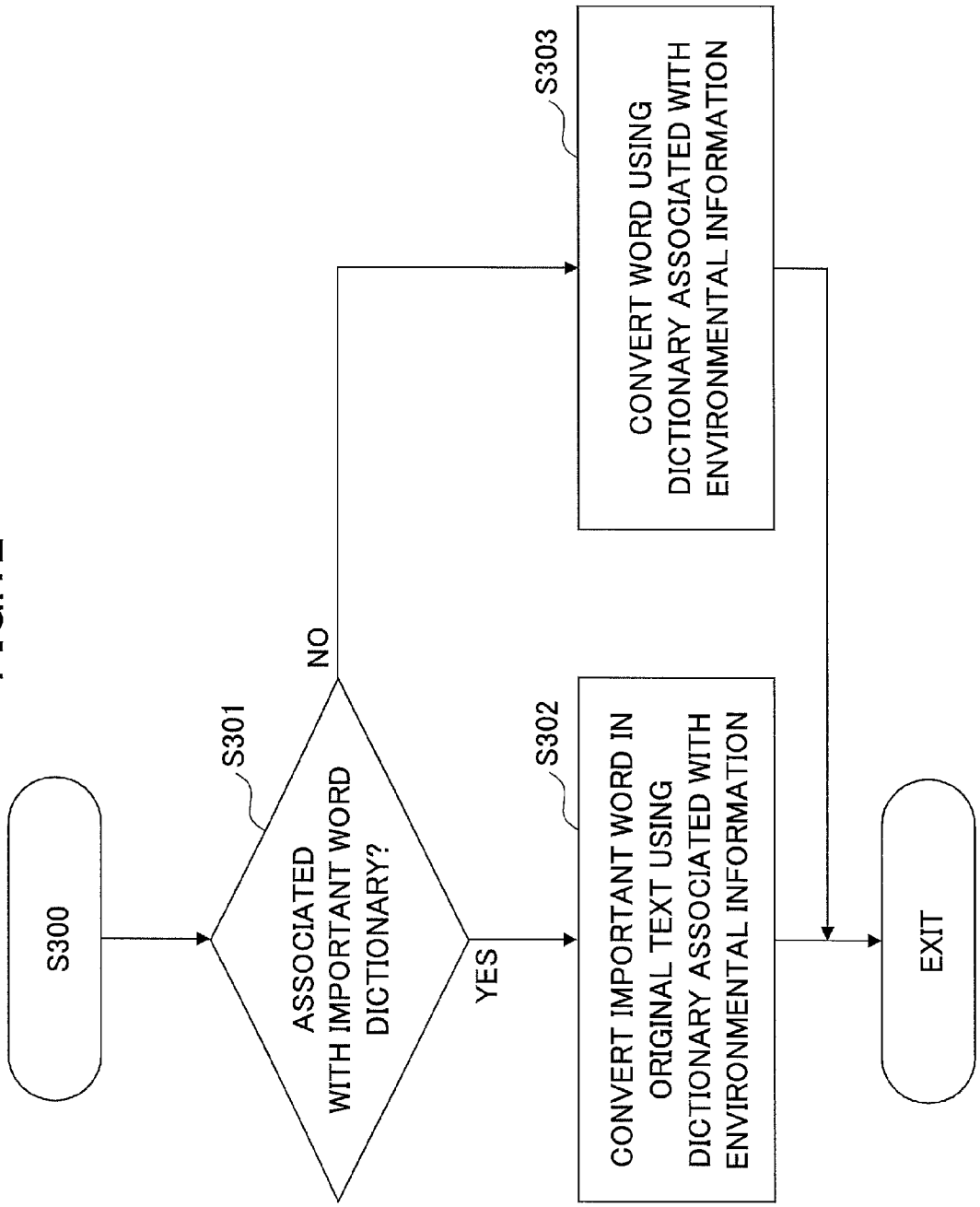
FIG. 12 is a flowchart illustrating exemplary detailed operations of a text optimization step illustrated in FIG. 11.

FIG. 12 is a flowchart illustrating exemplary detailed operations of step S300.

First, the text optimization unit 13 determines whether the environmental information is associated with the important word dictionary 32 (S301).

If the environmental information is associated with the important word dictionary 32 (S301, YES), the text optimization unit 13 converts an important word included in the original text into a corresponding word using the dictionary associated with the environmental information (S302). For example, in a case where the environmental information is "American", the important word is converted into English; in a case where the environmental information is "Chinese", the important word is converted into Chinese; and in a case where the environmental information is a combination of "Chinese" and "elementary schooler", the important word is converted into Chinese for elementary school children.

If the environmental information is not associated with the important word dictionary 32 (S301, NO), the text optimization unit 13 converts a word in the original text using a dictionary associated with the environmental information (S303). If a plurality of dictionaries are associated with the environmental information, the word may be converted using each of the dictionaries associated with the environmental information. If only one type of conversion is designated as an option setting, only the designated conversion is performed. For example, if only hiragana conversion is designated as an option setting, only hiragana conversion may be performed. If hiragana conversion and expression conversion are designated as the option setting, expression conversion may be performed followed by hiragana conversion. Note that priority rankings may be assigned to the dictionaries to determine the order in which conversions are to be performed, for example. In this way, expression conversion may be performed on a word before hiragana conversion is performed, for example. Further, the option settings may be set up such that after a word is converted into a corresponding expression using the expression dictionary 24, the expression is converted into a foreign language using the foreign language dictionary 23, for example.

Figure 13:
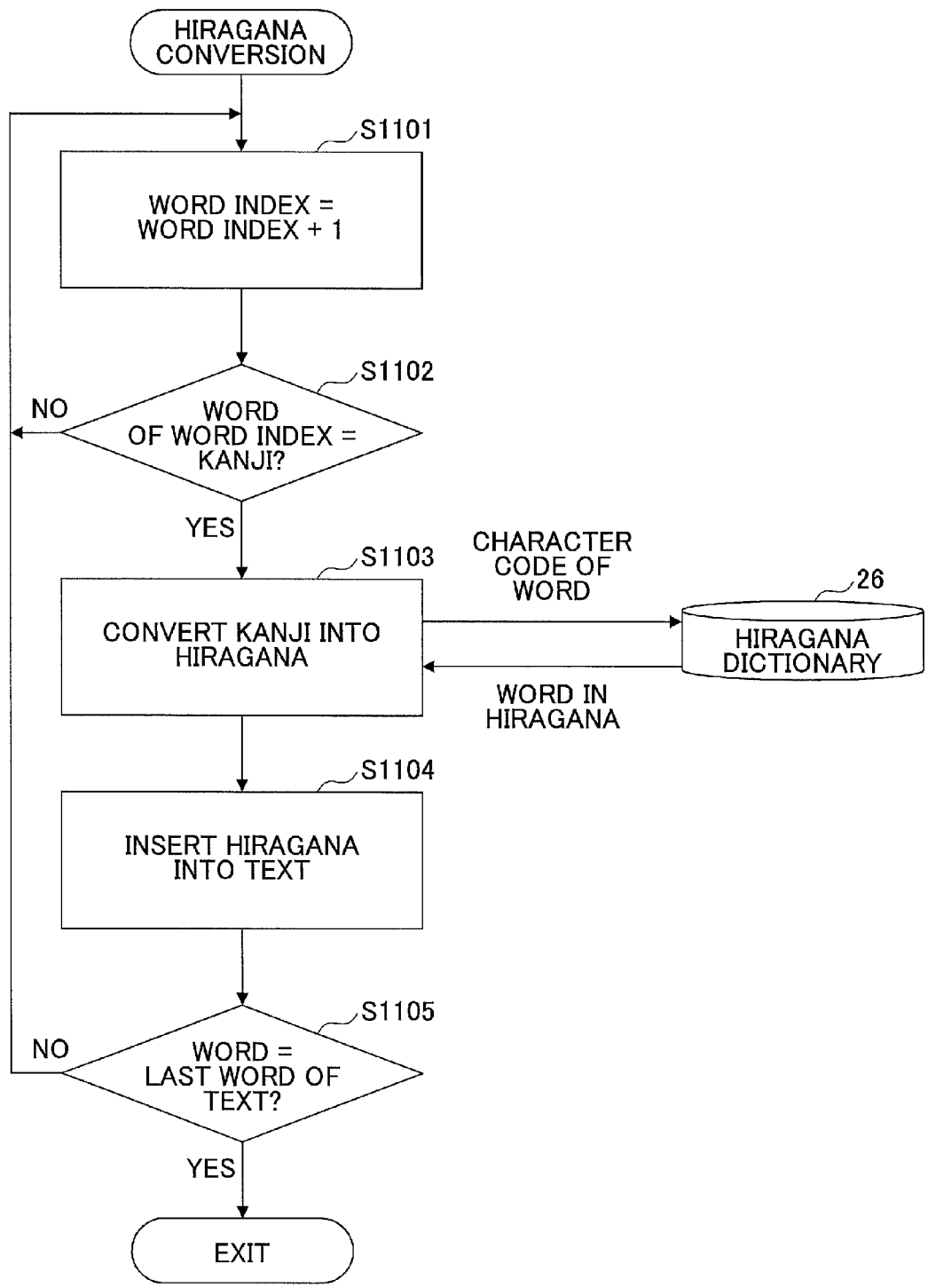
FIG. 13 is a flowchart illustrating exemplary process steps of a hiragana conversion process.

FIG. 13 is a flowchart illustrating exemplary process steps for performing hiragana conversion. The text optimization unit 13 increments a word index by 1 (S1101). Note that the original text is broken down into morphemes and sequential numbers (word index) are assigned to the morphemes starting from the beginning of the original text. The word index is set to a default value before the process of FIG. 13 is started.

The text optimization unit 13 determines whether a corresponding word of the word index is in kanji (S1102). Note that whether a word is in kanji may be determined based on whether a corresponding character code is included in a kanji region, for example.

If the word is not in kanji (S1102, NO), the process returns to step S1101 because there is no need to perform a hiragana conversion.

If the word is in kanji (S1102, YES), the text optimization unit 13 converts the word into hiragana (S1103). That is, the text optimization unit 13 searches the hiragana dictionary 26 based on the character code of the word of the original text and acquires the corresponding hiragana characters for the word.

Then, the text optimization unit 13 inserts the acquired hiragana characters after the word of the original text (S1104). In this way, the hiragana characters may be indicated along with the original word in kanji.

Then, the text optimization unit 13 determines whether the conversion process has been performed up to the last word of the original text (S1105). If the conversion process has not yet reached the last word of the original text, the conversion process is repeated from step S1101. If the conversion process has been completed up to the last word, the hiragana conversion process is ended.

For example, the following describes a case of converting the word "お客" (customer) into hiragana. The character code (UTF-16) for the word "お客" is "304a, 5ba2". If the kanji character "客" of this word is converted into corresponding hiragana characters "きゃく", the character code for the hiragana characters "きゃく" is "304d, 3083, 304f". Thus, if the hiragana characters "きゃく" are indicated after the word "お客", the corresponding character code may be as follows. Note that although the parentheses "( )" should actually be represented by character code, in the following example the parentheses "( )" are left as is.

お客（きゃく）=304a, 5ba2, (304d, 3083, 304f)

Figure 14:
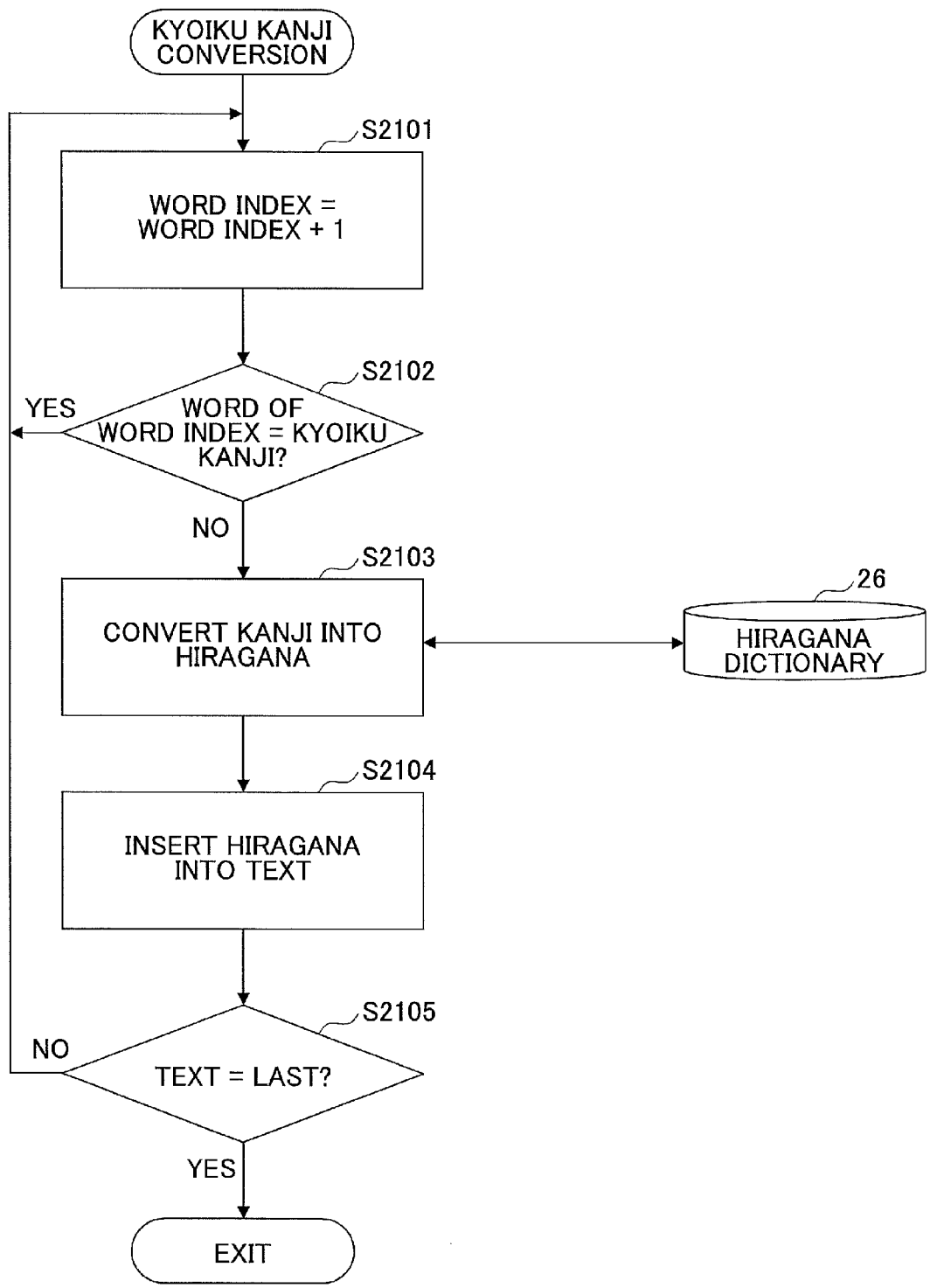
FIG. 14 is a flowchart illustrating exemplary process steps of a kyoiku kanji conversion process.

FIG. 14 is a flowchart illustrating exemplary process steps for performing kyoiku kanji ("education kanji") conversion. Kyoiku kanji refers to kanji characters (1,006 in total) that are taught during the six years of primary education in Japan. Thus, if the potential target (environmental information) is at least in middle school, there would be no need to convert kyoiku kanji into hiragana.

The text optimization unit 13 increments the word index by 1 (S2101). Note that the original text is broken down into morphemes, and sequential numbers (word index) are assigned to the morphemes starting from the beginning of the original text. The word index is set to a default value before the process of FIG. 14 is started.

The text optimization unit 13 determines whether a corresponding word of the word index is a kyoiku kanji character (S2102). Note that whether the word corresponds to a kyoiku kanji character may be determined based on whether the character code of the word corresponds to one of the character codes for the 1,006 kyoiku kanji characters.

If the word corresponds to a kyoiku kanji character (S2102, YES), the process returns to step S2101 because there is no need to perform a hiragana conversion.

If the word does not correspond to a kyoiku kanji character (S2102, NO), the text optimization unit 13 converts the word into hiragana because a middle schooler may not be able to read/understand the word (S2103). That is, the text optimization unit 13 searches the hiragana dictionary 26 based on the character code for the word of the original text, and acquires the corresponding hiragana characters for the word.

Then, the text optimization unit 13 inserts the hiragana characters after the word of the original text (S2104). In this way, the hiragana characters may be indicated along with the original word in kanji.

Then, the text optimization unit 13 determines whether the conversion process has been performed up to the last word in the original text (S2105). If the conversion process has not yet reached the last word, the conversion process is repeated from step S2101, and if the conversion process has reached the last word, the kyoiku kanji conversion process is ended.

For example, the following describes a case of converting the kanji word "微" (fine) into hiragana. The word "微" is not a kyoiku kanji character and is therefore converted to hiragana. The character code for the word "微" is "5fae". If the word "微" is converted into the corresponding hiragana character "び", the character code for the hiragana character "び" is "3073". Thus, if the hiragana character "び" is indicated after the kanji word "微", the corresponding character code may be as follows. Note that although the parentheses "( )" should actually be represented by character code, in the following example the parentheses "( )" are left as is.

微（び）=5fae (3073)

Figure 15:
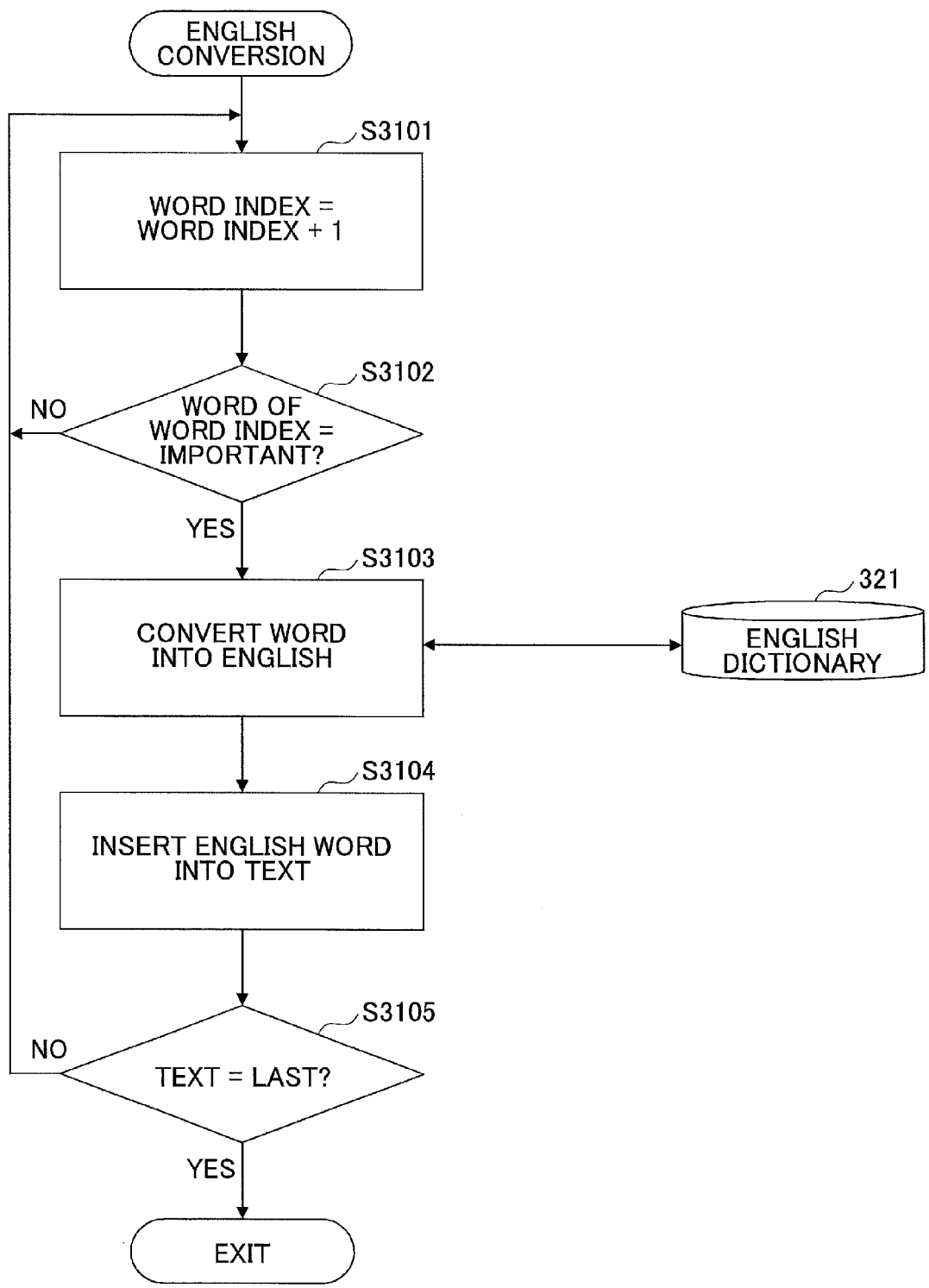
FIG. 15 is a flowchart illustrating exemplary process steps of an English conversion process.

FIG. 15 is a flowchart illustrating exemplary process steps for performing English conversion. In this example, it is assumed that the environmental information is associated with the important word dictionary 32.

The text optimization unit 13 increments the word index by 1 (S3101). Note that the original text is broken down into morphemes, and sequential numbers (word index) are assigned to the morphemes starting from the beginning of the original text. The word index is set to a default value before the process of FIG. 15 is started.

The text optimization unit 13 determines whether a corresponding word of the word index is registered in the important word dictionary 32 (S3102). Note that this determination may be made by searching through the words registered in the important word dictionary 32 to determine whether there is a word that matches the word of the original text, for example.

If the word is not registered in the important word dictionary 32 (S3102, NO), the process returns to step S3101 because there is no need to perform an English conversion.

If the word is registered in the important word dictionary 32 (S3102, YES), the text optimization unit 13 converts the word into English (S3103). That is, the text optimization unit 13 searches the English dictionary 321 based on the character code for the word of the original text, and acquires the corresponding English word for the original word.

Then, the text optimization unit 13 inserts the English word after the original word (S3104). In this way, the English word may be indicated along with the original word.

Then, the text optimization unit 13 determines whether the conversion process has been performed up to the last word in the original text (S3105). If the conversion process has not yet reached the last word, the conversion process is repeated from step S3101, and if the conversion process has reached the last word, the English conversion process is ended.

For example, if the word "お客" corresponds to an important word, the word "お客" is converted into the corresponding English word "customer". The character code for the English word "customer" is "ff54, ff4f, ff4d, ff45, ff52". Thus, if the English word "customer" is indicated after the word "お客", the corresponding character code may be as follows. Note that although the parentheses "( )" should actually be represented by character code, in the following example the parentheses "( )" are left as is.

お客 (customer)=304a, 5ba2 (ff54, ff4f, ff4d, ff45, ff52)

Figure 16:
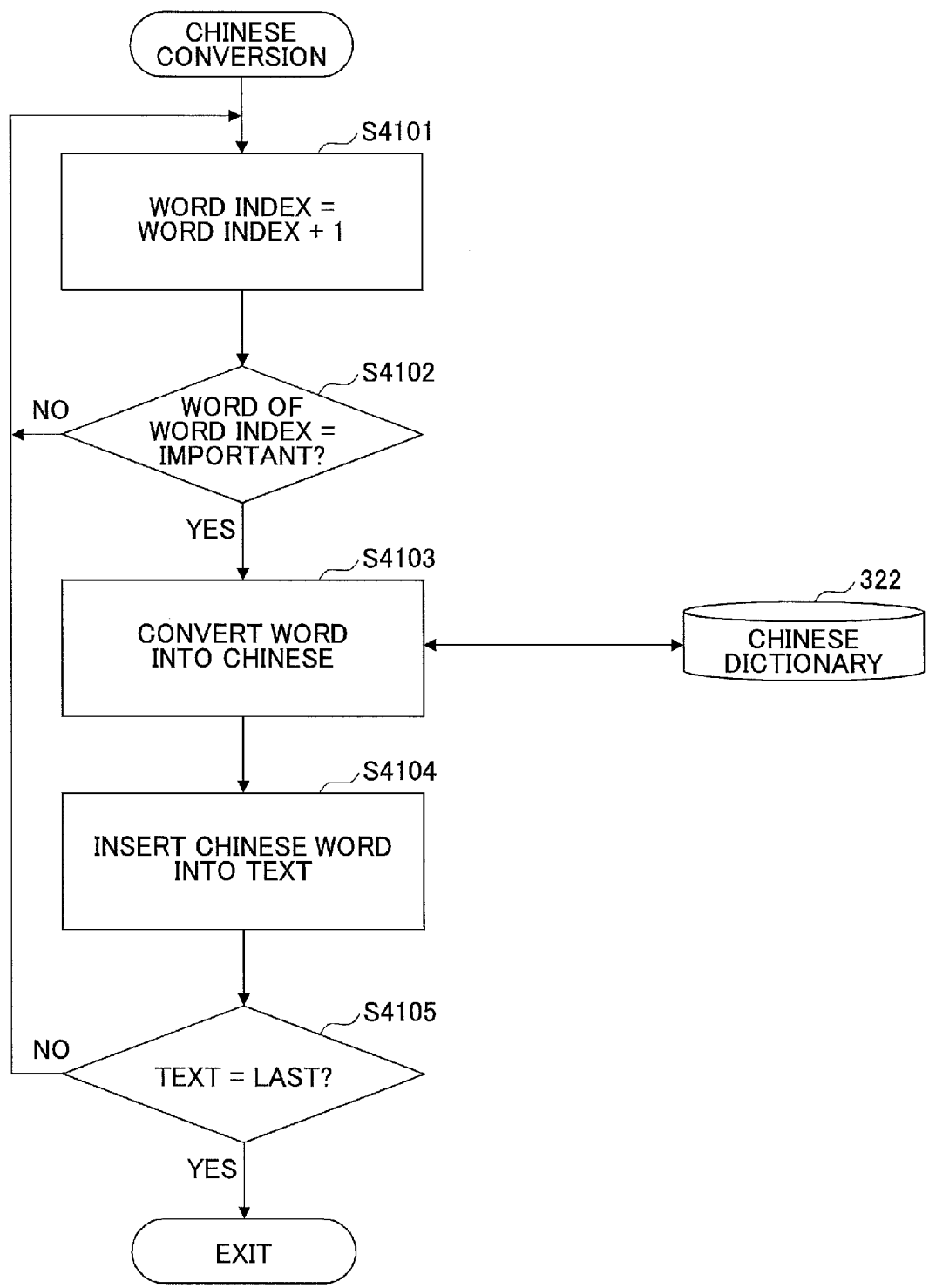
FIG. 16 is a flowchart illustrating exemplary process steps of a Chinese conversion process.

FIG. 16 is a flowchart illustrating exemplary process steps for performing Chinese conversion. In the present example, it is assumed that the environmental information is associated with the important word dictionary 32.

The text optimization unit 13 increments the word index by 1 (S4101). Note that the original text is broken down into morphemes, and sequential numbers (word index) are assigned to the morphemes starting from the beginning of the original text. The word index is set to a default value before the process of FIG. 16 is started.

The text optimization unit 13 determines whether a corresponding word of the word index is registered in the important word dictionary 32 (S4102). Note that this determination may be made by searching through the words registered in the important word dictionary 32 to determine whether there is a word that matches the word of the original text, for example.

If the word is not registered in the important word dictionary 32 (S4102, NO), the process returns to step S4101 because there is no need to perform a Chinese conversion.

If the word is registered in the important word dictionary 32 (S4102, YES), the text optimization unit 13 converts the word into Chinese (S4103). That is, the text optimization unit 13 searches the Chinese dictionary 322 based on the character code for the word of the original text, and acquires the corresponding Chinese word for the original word.

Then, the text optimization unit 13 inserts the Chinese word after the original word (S4104). In this way, the Chinese word may be indicated along with the original word.

Then, the text optimization unit 13 determines whether the conversion process has been performed up to the last word in the original text (S4105). If the conversion process has not yet reached the last word, the conversion process is repeated from step S4101, and if the conversion process has reached the last word, the Chinese conversion process is ended.

For example, if the word "お客" corresponds to an important word, the word "お客" is converted into the corresponding Chinese word "顧客". The character code for the Chinese word "顧客" is "7357, 5ba2". Thus, if the Chinese word "顧客" is indicated after the word "お客", the corresponding character code may be as follows. Note that although the parentheses "( )" should actually be represented by character code, in the following example the parentheses "( )" are left as is.

お客（顧客）=304a, 5ba2 (7357, 5ba2)

Figure 17:
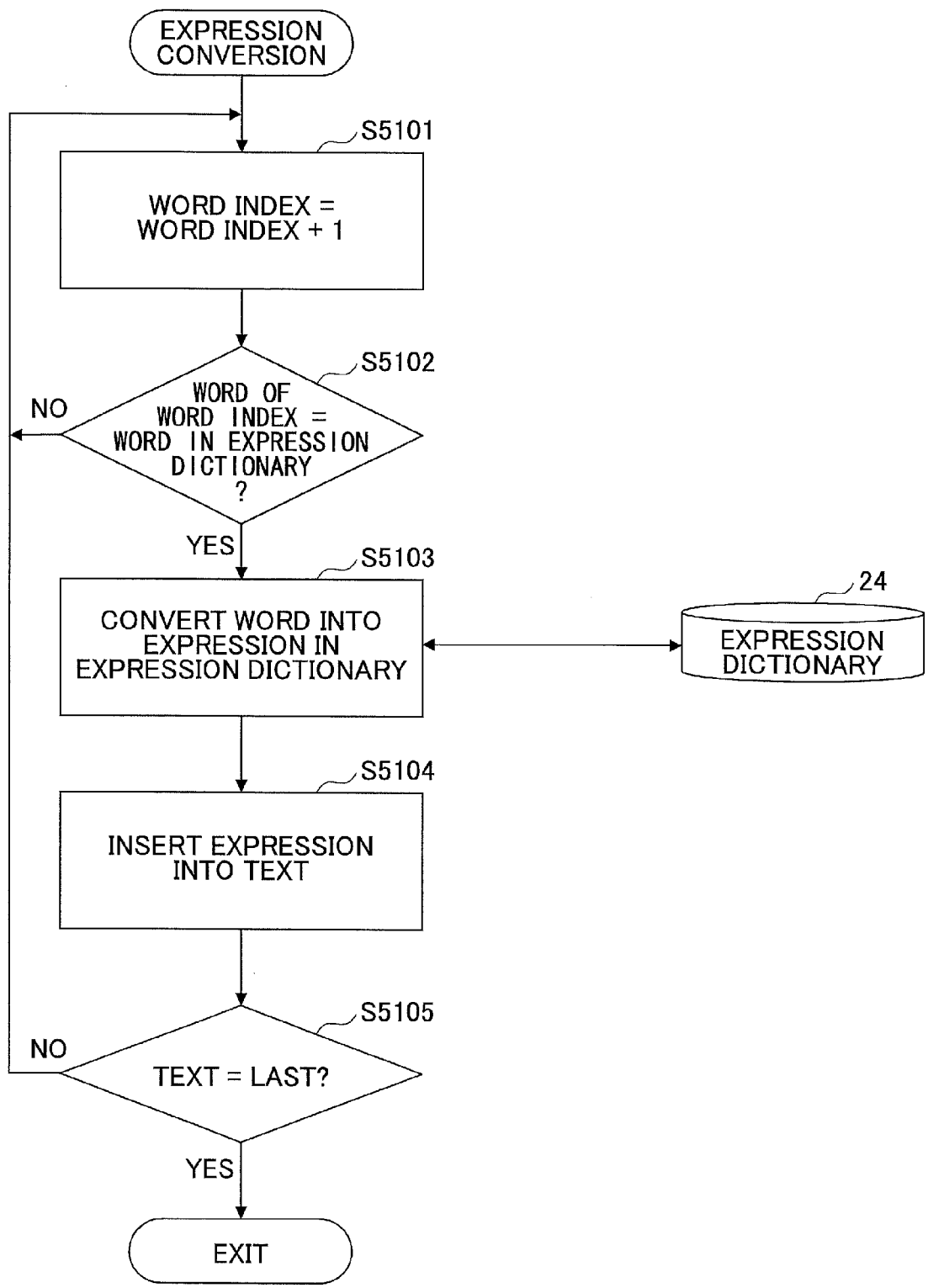
FIG. 17 is a flowchart illustrating exemplary process steps of an expression conversion process.

FIG. 17 is a flowchart illustrating exemplary process steps for performing expression conversion. In the present example, it is assumed that the environmental information is associated with the expression dictionary 24.

The text optimization unit 13 increments the word index by 1 (S5101). Note that the original text is broken down into morphemes, and sequential numbers (word index) are assigned to the morphemes starting from the beginning of the original text. The word index is set to a default value before the process of FIG. 17 is started.

The text optimization unit 13 determines whether a corresponding word of the word index is registered in the expression dictionary 24 (S5102). Note that this determination may be made by searching through the words registered in the expression dictionary 24 to determine whether there is a word that matches the word of the original text, for example.

If the word is not registered in the expression dictionary 24 (S5102, NO), the process returns to step S5101 because there is no need to perform an expression conversion.

If the word is registered in the expression dictionary 24 (S5102, YES), the text optimization unit 13 converts the word into a different expression (S5103). That is, the text optimization unit 13 acquires a corresponding expression associated with the character code for the original word.

Then, the text optimization unit 13 inserts the expression after the original word (S5104). In this way, the expression may be indicated along with the original word.

Then, the text optimization unit 13 determines whether the conversion process has been performed up to the last word in the original text (S5105). If the conversion process has not yet reached the last word, the conversion process is repeated from step S5101, and if the conversion process has reached the last word, the Chinese conversion process is ended.

For example, the word "イノベーション" (innovation) represented by the character code "30a4, 30ce, 30d9, 2015, 30b7, 30e7, 30f3" may be converted into the expression "新しい ぎじゅつ" (new technology). The character code for the expression "新しい ぎじゅつ" is "65b0, 3057, 3044, 304e, 3058, 3085, 3064". Thus, if the expression "新しいぎじゅつ" is indicated after the word "イノベーション", the corresponding character code may be as follows. Note that although the parentheses "( )" should actually be represented by character code, in the following example the parentheses "( )" are left as is.

イノベーション（新しい ぎじゅつ）=30a4, 30ce, 30d9, 2015, 30b7, 30e7, 30f3 (65b0, 3057, 3044, 304e, 3058, 3085, 3064)

Figure 18:
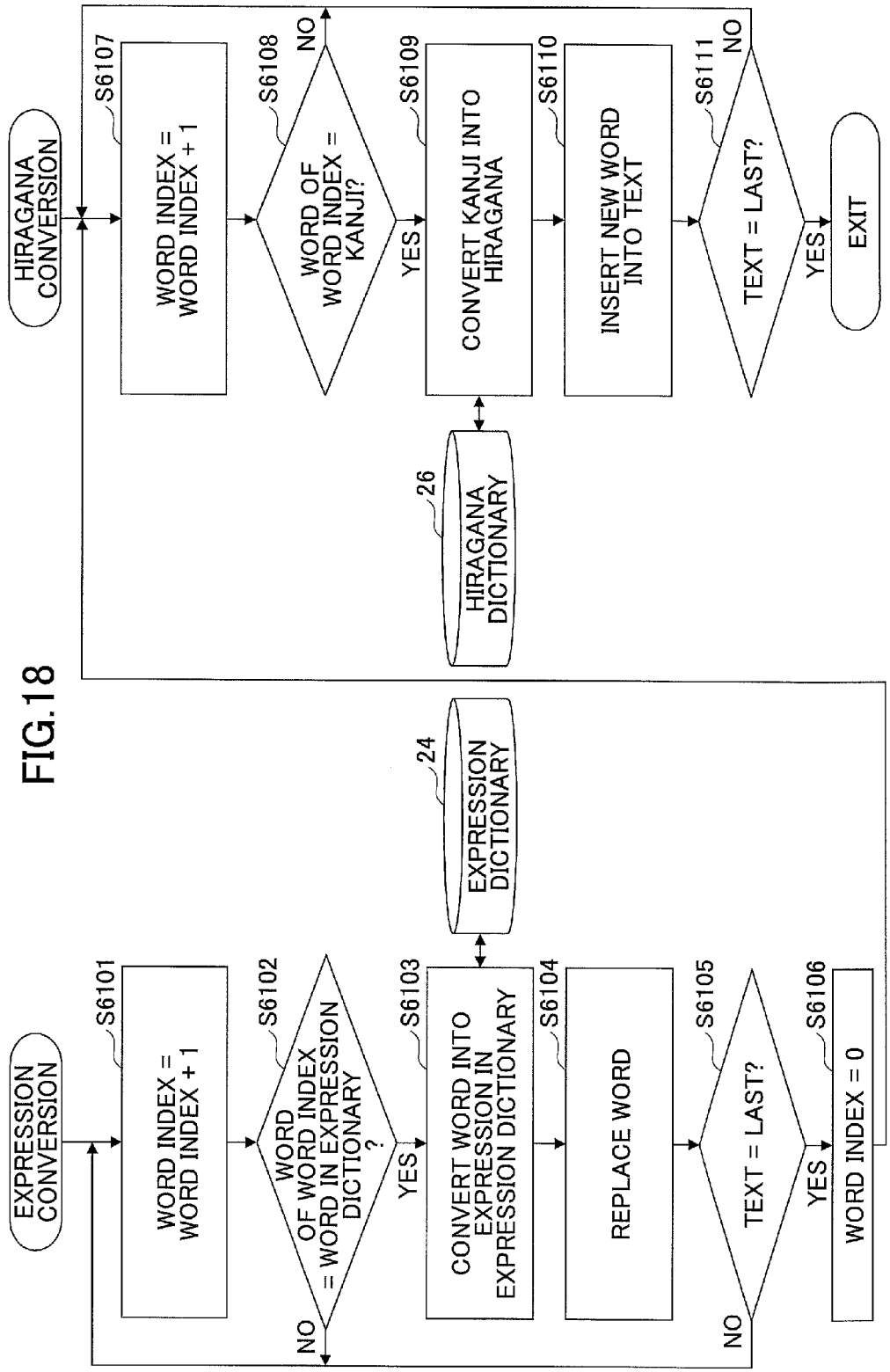
FIG. 18 is a flowchart illustrating exemplary process steps for successively performing expression conversion and hiragana conversion.

FIG. 18 is a flow chart illustrating exemplary process steps for successively performing expression conversion and hiragana conversion. In the present example, it is assumed that the environmental information is associated with the expression dictionary 24 and the hiragana dictionary 26.

Note that steps S6101-S6105 may be substantially identical to steps S5101-S5105 of FIG. 17. However, in step S6104 of FIG. 18, the word of the original text is replaced by the corresponding expression rather than being indicated along with the corresponding expression.

Also, upon reaching the end of the text in step S6105, the word index is initialized to the default value (S6106). Note that by performing the process operations up to step S6106, the original text "コリー社は、お客様のワークスタイル・イノベーションを実現する IT ソリューションをご提供いたします。" may be converted into "コリー社は、お客様の仕事の内容・新しい技術を作るお仕事をご 提供します。".

Then, the text optimization unit 13 performs hiragana conversion on the above converted text "コリー社は、お客様の仕事の内容・新しい技術を作る お仕事をご 提供します。".

Note that steps S6107-S6111 of FIG. 18 may be substantially identical to steps S1101-S1105 of FIG. 13. By performing these process steps, the above converted text "コリー社は、お 客様の仕事の内容・新しい 技術を作るお 仕事をご提供 します。" may be further converted into "コリー社（しゃ）は、お客様（おきゃくさま）の仕事（しごと）の内容（ないよう）・新しい（あたらしい）技術（ぎじゅつ）を作る（つくる）お仕事（しごと）をご提供（ていきょう）します。".

Figure 19:
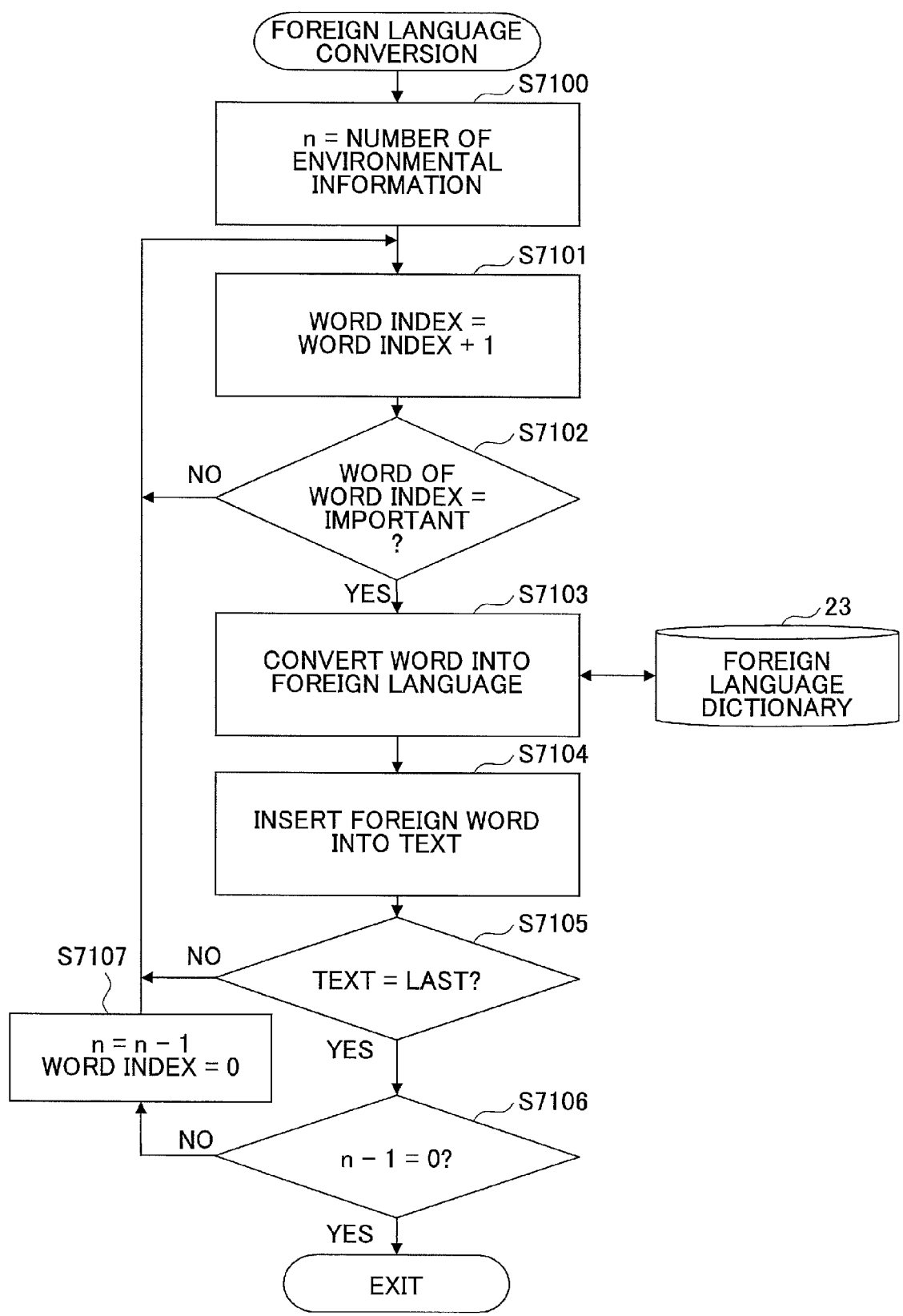
FIG. 19 is a flowchart illustrating exemplary process steps for performing foreign language conversion multiple times.

FIG. 19 is a flowchart illustrating exemplary process steps for performing foreign language conversion multiple times. That is, in the present example, it is assumed that multiple items of environmental information associated with the important word dictionary 32 are input.

Note that steps S7101-S7105 of FIG. 19 may be substantially identical to steps S3101-S3105 and steps S4101-S4105 of FIGS. 15 and 16. However, in step S7100 of FIG. 19, the number of environmental information items is set up in variable n.

Subsequently, when the process reaches the end of the text, a determination is made as to whether variable n−1 is equal to "0" (S7106).

If the variable n−1 is not equal to "0", this means that a conversion process should be performed based on other environmental information that has been input. Accordingly, the text optimization unit 13 decrements the variable n by 1, initializes the word index (S7107), and repeats the process from step S7101.

For example, if the environmental information items "American" and "Chinese" are input, the following converted text may be obtained.

コリー社 (Cory, 光理) は、お客様 (customer, 顧客) の仕事 (work, 工作) の内容・新しい技術 (technology, 技術) を作る (make, 造) お仕事をご提供 (provide, 提供) いたします。

Display Examples

FIG. 20A illustrates an example of an original text.

FIG. 20B illustrates an example of a converted text for an infant obtained by performing hiragana conversion on the original text.

FIG. 20C illustrates an example of a converted text for a middle schooler obtained by performing expression conversion on the original text. In this example, corresponding expressions are displayed alongside the original words.

FIG. 20D illustrates an example of a converted text for an infant obtained by successively performing expression conversion and hiragana conversion on the original text. In this example, original words are replaced by corresponding expressions, and corresponding hiragana words are displayed alongside kanji words remaining after the expression conversion is performed.

FIG. 20E illustrates an example of a converted text for Americans obtained by converting important words into English words. In the present example, the English words are displayed alongside the original important words.

FIG. 20F illustrates an example of a converted text for Chinese obtained by converting important words into Chinese words. In the present example, the Chinese words are displayed alongside the original important words.

FIG. 20G illustrates an example of a converted text for Americans and Chinese obtained by converting important words into English words and Chinese words. In the present example, the English words and Chinese words are displayed alongside the original important words.

The above exemplary converted texts may be obtained by the text optimization unit 13 performing conversions using different dictionaries 23. For example, the converted text for Americans and Chinese may be obtained by performing English conversion on the original text using the English dictionary 321, and performing Chinese conversion using the Chinese dictionary 322 thereafter. In this way, English and Chinese translations of important words may be displayed alongside the important words of the original text. For example, "Cory, 光理" is displayed alongside "コリー社", "customer, 顧客" is displayed alongside "お客様", "work, 工作" is displayed alongside "仕事", "technology, 技術" is displayed alongside "技 術", "make, 造" is displayed alongside "作る", and "provide, 提供" is displayed alongside "ご提供".

Note that in some embodiments, instead of displaying converted words after the original words as in FIGS. 20B-20G, the converted words may be displayed above or below the original words, for example. In this case, the converted words may be displayed as the so-called "ruby text" in a smaller font size than that of the original word to improve readability of the text, for example.

Also, in some embodiments, if a verb appears as a word in the original text, depending on the language into which the original text is to be converted, the verb and a noun corresponding to the object of the verb may be displayed in reverse order. For example, with respect to the partial original text "I T ソリューションをご提供 いたします。", the text processing apparatus 100 may convert this text into English and Chinese as follows.

English: I T ソリューションをご提供 します (provide solution) いたします。

Chinese: I T ソリューションをご提供 (提供 解決方案) いたします。

As can be appreciated, in the original text in Japanese, the noun "ソリューション" (solution) appears before the verb "提供" (provide). In the above exemplary converted texts, the corresponding English and Chinese words "solution" and "解決方案" for the original Japanese word "ソリューション" appear after the verb "提供 (provide, 提供)". In this way, the English and Chinese converted texts may be closer to the English and Chinese word order and may therefore be more easily comprehensible by English and Chinese speakers, for example.

As described above, the text processing apparatus 100 of the present embodiment converts a word into another word according to environmental information and indicates the converted word along with the word of the original text. In this way, the main target (e.g. Japanese adults) and some other potential target may be able to read/comprehend the text at the same time.

Although the present invention has been described above with reference to certain illustrative embodiments, the present invention is not limited to these embodiments, and numerous variations and modifications may be made without departing from the scope of the present invention.

Note that in addition to the embodiments illustrated in FIGS. 3A-3E, the functional elements of the text processing apparatus 100 may be implemented in any information processing apparatus existing on a network. For example, the morphological analysis unit 12 and/or the text optimization unit 13 may be implemented in the display 200, or the functional elements of the text processing apparatus 100 may be implemented in a plurality of information processing apparatuses.

Also, the dictionaries used in the present embodiment do not necessarily have to be included in the text processing apparatus 100, but may alternatively be provided at another location that may be accessed by the text processing apparatus 100 via a network, for example.

Further, the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-172530 filed on Aug. 22, 2013, the entire contents of which are hereby incorporated by reference.

What is claimed is:

1. A text processing apparatus comprising:
    a memory configured to store a program; and
    a processor configured to execute the program and perform a process including,
    acquiring environmental information;
    acquiring text;
    extracting a word from the text; and
    converting the word extracted from the text into a converted word using a dictionary that is accessed according to the acquired environmental information, and
    indicating the converted word along with the word extracted from the text, wherein a dictionary-registered word corresponding to the word extracted from the text is read from the dictionary associated with the acquired environmental information, and wherein when the acquired environmental information is associated with a first dictionary and a second dictionary, a first dictionary-registered word corresponding to the word extracted from the text is read from the first dictionary, the word extracted from the text is replaced with the first dictionary-registered word, a second dictionary-registered word corresponding to the first dictionary-registered word replacing the word extracted from the text is read from the second dictionary, and the second dictionary-registered word is indicated along with the first dictionary-registered word.

2. The text processing apparatus as claimed in claim 1, wherein the environmental information specifies at least one of a potential reader of the acquired text and a location at which the acquired text is displayed.

3. The text processing apparatus as claimed in claim 1, wherein the converted word is indicated within the acquired text, in which the converted word within the acquired text is indicated alongside the word before being converted within the acquired text, and wherein
    when first environmental information and second environmental information is acquired, a third dictionary-registered word corresponding to the word extracted from the text is read from a third dictionary associated with the acquired first environmental information, the third dictionary-registered word is indicated along with the word extracted from the text, a fourth dictionary-registered word corresponding to the word extracted from the text is read from a fourth dictionary associated with the acquired second environmental information, and the third dictionary-registered word and the fourth dictionary-registered word are indicated along with the word extracted from the text.

4. The text processing apparatus as claimed in claim 1, wherein
    the environmental information is attached at a beginning of the text to be acquired;
    the environmental information attached at the beginning of the text is acquired; and
    the converted word is indicated along with the word extracted from the text having the environmental information attached thereto.

5. A text display system comprising:
    a memory configured to store a program; and
    a processor configured to execute the program and perform a process including,
    acquiring environmental information;
    acquiring text;
    extracting a word from the text; and
    converting the word extracted from the text into a converted word using a dictionary that is accessed according to the acquired environmental information;
    indicating the converted word along with the word extracted from the text; and
    displaying the text that is converted to indicate the converted word along with the word extracted from the text, wherein a dictionary-registered word corresponding to the word extracted from the text is read from the dictionary associated with the acquired environmental information, and wherein when the acquired environmental information is associated with a first dictionary and a second dictionary, a first dictionary-registered word corresponding to the word extracted from the text is read from the first dictionary, the word extracted from the text is replaced with the first dictionary-registered word, a second dictionary-registered word corresponding to the first dictionary-registered word replacing the word extracted from the text is read from the second dictionary, and the second dictionary-registered word is indicated along with the first dictionary-registered word.

6. A non-transitory computer-readable medium having a program recorded thereon that is executable by a computer, the program when executed causing the computer to perform a process including:
    acquiring environmental information;
    acquiring text;
    extracting a word from the text; and
    converting the word extracted from the text into a converted word using a dictionary that is accessed according to the acquired environmental information, and indicating the converted word along with the word extracted from the text, wherein a dictionary-registered word corresponding to the word extracted from the text is read from the dictionary associated with the acquired environmental information, and wherein when the acquired environmental information is associated with a first dictionary and a second dictionary, a first dictionary-registered word corresponding to the word extracted from the text is read from the first dictionary, the word extracted from the text is replaced with the first dictionary-registered word, a second dictionary-registered word corresponding to the first dictionary-registered word replacing the word extracted from the text is read from the second dictionary, and the second dictionary-registered word is indicated along with the first dictionary-registered word.

7. The non-transitory computer-readable medium as claimed in claim 6, wherein the environmental information specifies at least one of a potential reader of the acquired text and a location at which the acquired text is displayed.

8. The non-transitory computer-readable medium as claimed in claim 6, wherein the converted word is indicated within the acquired text, in which the converted word within the acquired text is indicated alongside the word before being converted within the acquired text, and wherein when first environmental information and second environmental information is acquired, a third dictionary-registered word corresponding to the word extracted from the text is read from a third dictionary associated with the acquired first environmental information, the third dictionary-registered word is indicated along with the word extracted from the text, a fourth dictionary-registered word corresponding to the word extracted from the text is read from a fourth dictionary associated with the acquired second environmental information, and the third dictionary-registered word and the fourth dictionary-registered word are indicated along with the word extracted from the text.

9. The non-transitory computer-readable medium as claimed in claim 6, wherein the environmental information is attached at a beginning of the text to be acquired;

the environmental information attached at the beginning of the text is acquired; and the converted word is indicated along with the word extracted from the text having the environmental information attached thereto.

\* \* \* \* \*